US012466188B2

(12) United States Patent
Kobayashi

(10) Patent No.: US 12,466,188 B2
(45) Date of Patent: Nov. 11, 2025

(54) FLOW-PATH COUPLING MEMBER, HEAD UNIT, AND LIQUID EJECTING APPARATUS

(71) Applicant: SEIKO EPSON CORPORATION, Tokyo (JP)

(72) Inventor: Haruki Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 18/328,934

(22) Filed: Jun. 5, 2023

(65) Prior Publication Data

US 2023/0391093 A1 Dec. 7, 2023

(30) Foreign Application Priority Data

Jun. 6, 2022 (JP) ................................ 2022-091398

(51) Int. Cl.
*B41J 2/175* (2006.01)

(52) U.S. Cl.
CPC .................................... *B41J 2/175* (2013.01)

(58) Field of Classification Search
CPC .............................. B41J 2/175; B41J 2/17523
See application file for complete search history.

(56) References Cited

U.S. PATENT DOCUMENTS

2011/0228012 A1* 9/2011 Yoshida ............... B41J 2/14274 347/68
2014/0043395 A1* 2/2014 Shimizu ................. B41J 2/1752 347/44
2015/0042722 A1* 2/2015 Watanabe ............ B41J 2/14145 347/44
2019/0184702 A1 6/2019 Takekoshi et al.

FOREIGN PATENT DOCUMENTS

JP 2019-107775 A 7/2019

* cited by examiner

*Primary Examiner* — Anh T Vo
(74) *Attorney, Agent, or Firm* — WORKMAN NYDEGGER

(57) ABSTRACT

A flow-path coupling member includes: first-face coupling portions each configured to be coupled to a corresponding one of flow paths of a first flow-path member; second-face coupling portions each configured to be coupled to a corresponding one of flow paths of a second flow-path member; coupling flow paths each connecting a corresponding one of the first-face coupling portions and a corresponding one of the second-face coupling portions; a first outer surface facing a first direction; and a second outer surface facing a second direction intersecting the first direction, the first-face coupling portions are provided in the first outer surface and arranged in the second direction, and the second-face coupling portions are provided in the second outer surface and arranged in the first direction.

16 Claims, 20 Drawing Sheets

1
3
4
5
6
10
20
51
52
53
54
55
56
57
58
59
60
NZ
PA
DM
P
X
X1
X2
Y
Y1
Y2

FLOW-PATH COUPLING MEMBER, HEAD UNIT, AND LIQUID EJECTING APPARATUS

The present application is based on, and claims priority from JP Application Serial Number 2022-091398, filed Jun. 6, 2022, the disclosure of which is hereby incorporated by reference herein in its entirety.

BACKGROUND

1. Technical Field

The present disclosure relates to a technology for flow-path coupling members, head units, and liquid ejecting apparatuses.

2. Related Art

A flow-path coupling member configured to couple supply flow paths which are a flow-path member coupled to a liquid container and a base member which is a flow-path member of a liquid ejecting head is known. JP-A-2019-107775 is an example of a related technology.

In the related technology, the direction faced by the surface in which the upstream coupling portion is formed, the upstream coupling portion being configured to be coupled to the supply flow paths, is not parallel to but rather intersects the direction faced by the surface in which the downstream coupling portion is formed, the downstream coupling portion being configured to be coupled to the base member. This makes the flow paths in the flow-path coupling member three-dimensional, increasing the size of the flow-path coupling member in some cases. Hence, a technology for preventing an increase in the size of a flow-path coupling member has been desired.

SUMMARY

A first aspect of the present disclosure provides a flow-path coupling member. The flow-path coupling member includes: a plurality of first-face coupling portions each configured to be coupled to a corresponding one of flow paths of a first flow-path member; a plurality of second-face coupling portions each configured to be coupled to a corresponding one of flow paths of a second flow-path member; a plurality of coupling flow paths each connecting a corresponding one of the first-face coupling portions and a corresponding one of the second-face coupling portions; a first outer surface facing a first direction; and a second outer surface facing a second direction intersecting the first direction, the plurality of first-face coupling portions are provided in the first outer surface and arranged in the second direction, and the plurality of second-face coupling portions are provided in the second outer surface and arranged in the first direction.

A second aspect of the present disclosure provides a head unit. The head unit includes: the flow-path coupling member of the above aspect; a first flow-path member coupled to the plurality of first-face coupling portions of the flow-path coupling member; and a nozzle configured to eject liquid supplied from the first flow-path member.

A third aspect of the present disclosure provides a liquid ejecting apparatus. The liquid ejecting apparatus includes: the head unit of the above aspect; and a second flow-path member coupled to the plurality of second-face coupling portions of the flow-path coupling member.

DESCRIPTION OF EXEMPLARY EMBODIMENTS

A. Embodiment

Hereinafter, embodiments to implement the present disclosure will be described with reference to the drawings. In each drawing, the dimensions and scale of each portion differ from actual ones as appropriate. In the following description, the three directions orthogonal to one another are referred to as the X-axis direction, the Y-axis direction, and the Z-axis direction in some cases. The X-axis direction includes the X1 direction and the X2 direction opposite to each other. The Y-axis direction includes the Y1 direction and the Y2 direction opposite to each other. The Z-axis direction includes the Z1 direction and the Z2 direction opposite to each other. The X-axis direction and the Y-axis direction are, for example, horizontal directions.

Figure 1:
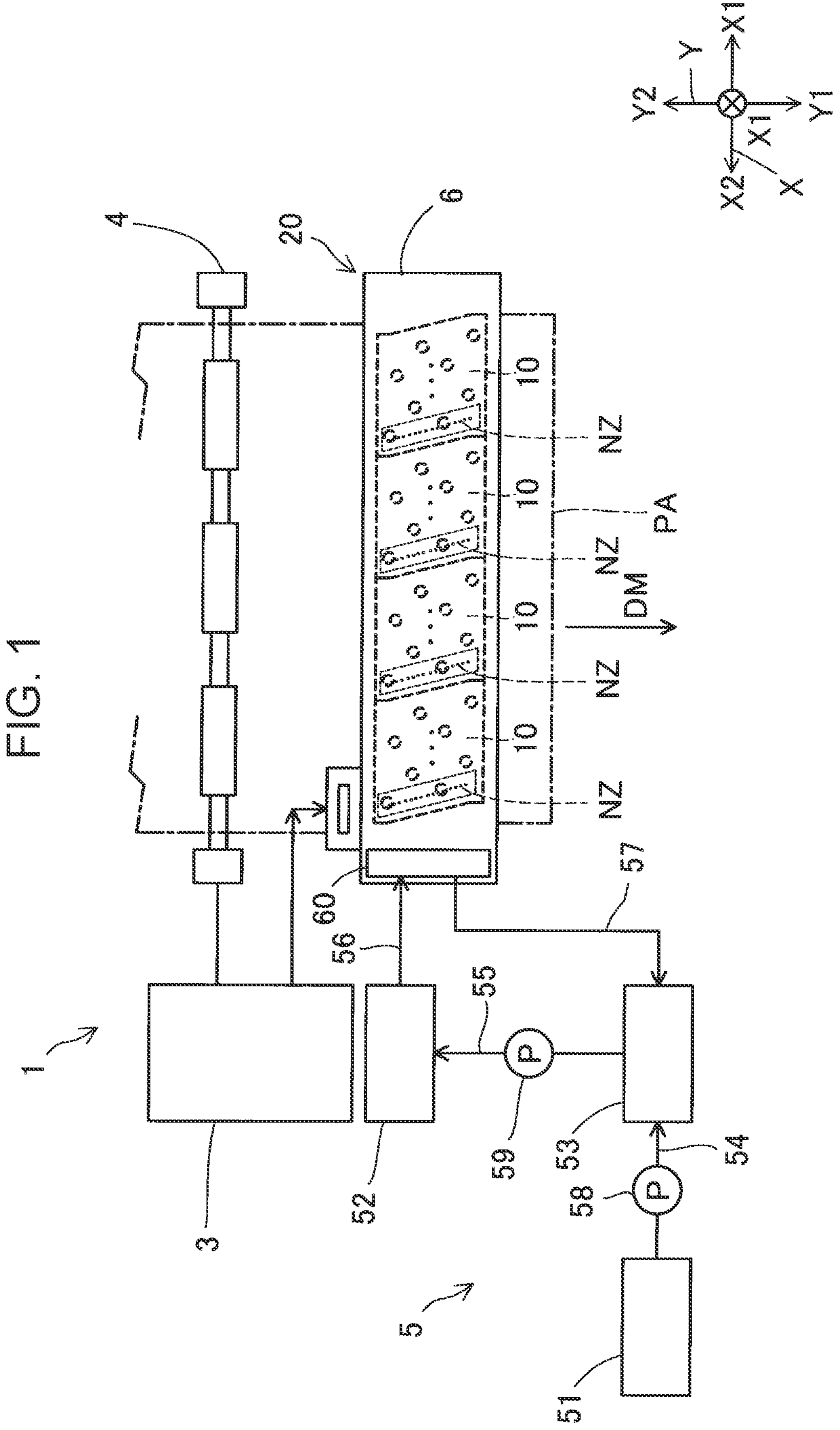
FIG. 1 is a schematic diagram illustrating a liquid ejecting apparatus according to an embodiment.

FIG. 1 is a schematic diagram illustrating a liquid ejecting apparatus 1 according to an embodiment. The liquid ejecting apparatus 1 is an ink jet printing apparatus configured to eject ink, which is an example of a liquid, onto a medium PA as droplets. The liquid ejecting apparatus 1 of the present embodiment is a so-called line printing apparatus in which a plurality of nozzles configured to eject ink are distributed across the entire width of the medium PA. The medium PA is typically a printing sheet. However, the medium PA is not limited to a printing sheet and may be, for example, a print target of an appropriate material, such as plastic film or fabric.

The liquid ejecting apparatus 1 includes a control unit 3, a medium transportation mechanism 4, a supply circulation mechanism 5, and a head unit 20. The head unit includes a plurality of liquid ejecting heads 10 and a flow-path coupling member 60 communicating with the plurality of liquid ejecting heads 10.

The supply circulation mechanism 5 is configured to supply liquid to the liquid ejecting heads 10 via the flow-path coupling member 60 and collect the liquid from the liquid ejecting heads 10 via the flow-path coupling member 60. The supply circulation mechanism 5 includes a main tank 51, a collection-side sub-tank 53, a supply-side sub-tank 52, a first intermediate flow path 54, a second intermediate flow path 55, a supply flow path 56, a collection flow path 57, a first pump 58, and a second pump 59.

The main tank 51 stores liquid. Examples of the main tank 51 include a cartridge configured to be attached to and detached from the liquid ejecting apparatus 1, an ink pack in the form of a bag formed of a flexible film, and a tank to which ink can be added. Note that liquid stored in the main tank 51 may be of any kind. The present embodiment includes a plurality of main tanks 51 associated with kinds of ink. Specifically, the liquid ejecting apparatus 1 includes a main tank 51 storing cyan ink, a main tank 51 storing magenta ink, a main tank 51 storing yellow ink, and a main tank 51 storing black ink. Note that the supply circulation mechanism 5 has a plurality of sets of components such as a plurality of the main tanks 51 according to the number of the main tanks 51; however, FIG. 1 illustrates only the components for a supply circulation mechanism 5 associated with one main tank 51.

The collection-side sub-tank 53 collects the liquid discharged from the liquid ejecting heads 10 via the flow-path coupling member 60 and the collection flow path 57. The collection-side sub-tank 53 stores the collected liquid. The collection-side sub-tank 53 is coupled to the main tank 51 via the first intermediate flow path 54. When the first pump 58 is driven, liquid in the main tank 51 is supplied to the collection-side sub-tank 53 via the first intermediate flow path 54. Note that the main tank 51 may be coupled to the supply-side sub-tank 52 instead of to the collection-side sub-tank 53. The collection-side sub-tank 53 is coupled to the supply-side sub-tank 52 via the second intermediate flow path 55. When the second pump 59 is driven, liquid in the collection-side sub-tank 53 is supplied to the supply-side sub-tank 52 via the second intermediate flow path 55.

The supply-side sub-tank 52 supplies liquid to the flow-path coupling member 60 via the supply flow path 56. The first intermediate flow path 54, the second intermediate flow path 55, the supply flow path 56, and the collection flow path 57 are, for example, tubes. The first intermediate flow path 54, the second intermediate flow path 55, the supply flow path 56, and the collection flow path 57 need only be configured to enable liquid to flow through and may be, for example, structures having grooves or recesses in which liquid flows. The first pump 58 and the second pump 59 are driven in response to commands from the control unit 3.

The control unit 3 controls operation of the components of the liquid ejecting apparatus 1. The control unit 3 includes, for example, a processing circuit such as a CPU or an FPGA and a memory circuit such as semiconductor memory. The memory circuit stores various programs and various kinds of data. The processing circuit executes various programs and uses various kinds of data as appropriate to achieve various kinds of control. "CPU" is an abbreviation for central processing unit. "FPGA" is an abbreviation for field programmable gate array.

The medium transportation mechanism 4 transports the medium PA in a transport direction DM under control of the control unit 3. The medium transportation mechanism 4 includes an elongated transportation roller extending in the width direction of the medium PA and a motor that rotates the transportation roller. Note that the medium transportation mechanism 4 is not limited to a configuration including a transportation roller and may have, for example, a configuration including a drum or an endless belt that transports a medium PA attached to the outer peripheral surface of the drum or belt by using an electrostatic force or the like.

The liquid ejecting head 10 is controlled by the control unit 3. The liquid ejecting head 10 has nozzles NZ that eject liquid supplied from a common flow-path member 30 described later. The liquid ejected from the nozzles NZ lands on the medium PA. The plurality of the liquid ejecting heads 10 arranged in a direction intersecting the transport direction DM compose a line head 6.

Figure 2:
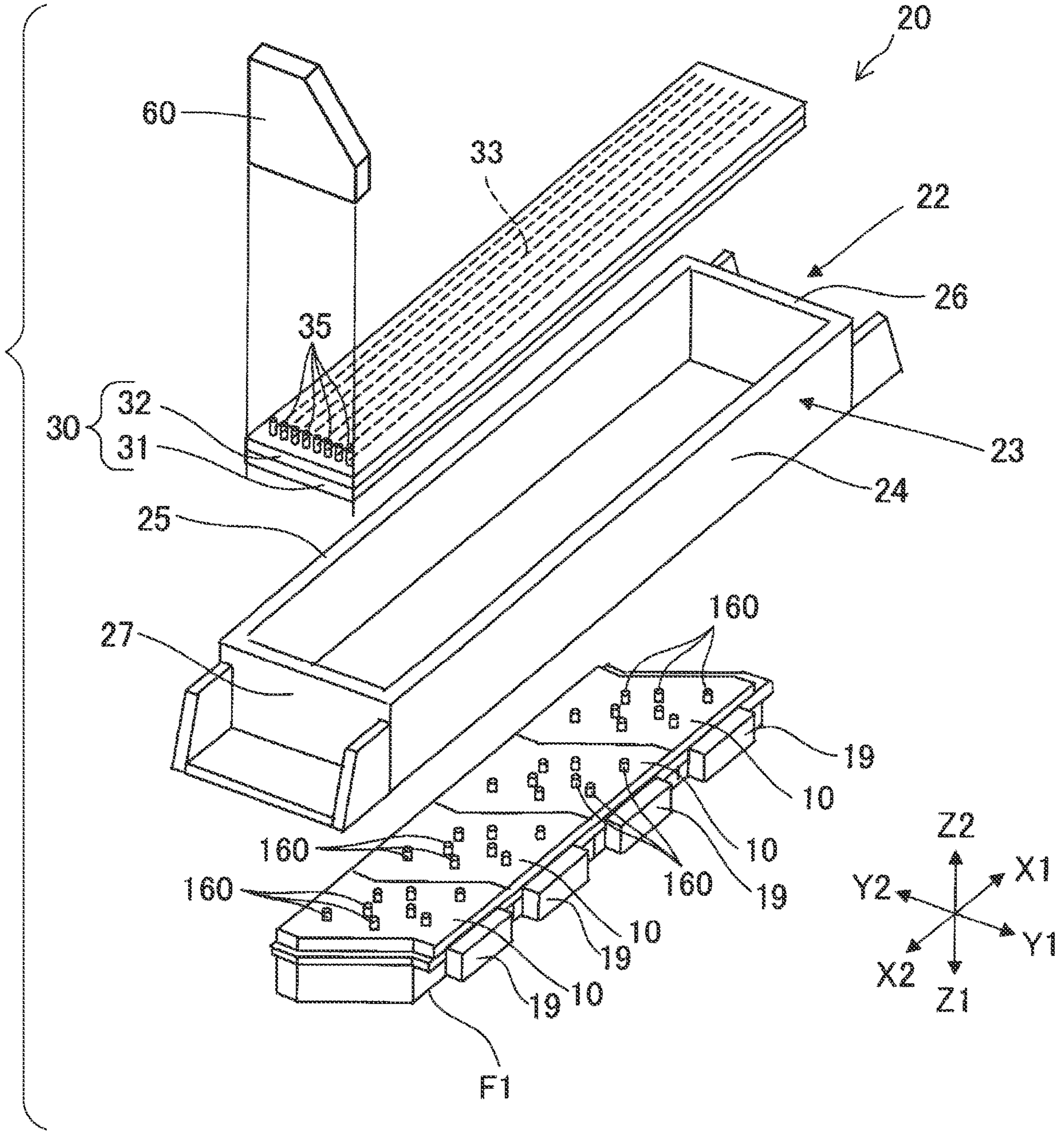
FIG. 2 is an exploded perspective view of a head unit.
Figure 3:
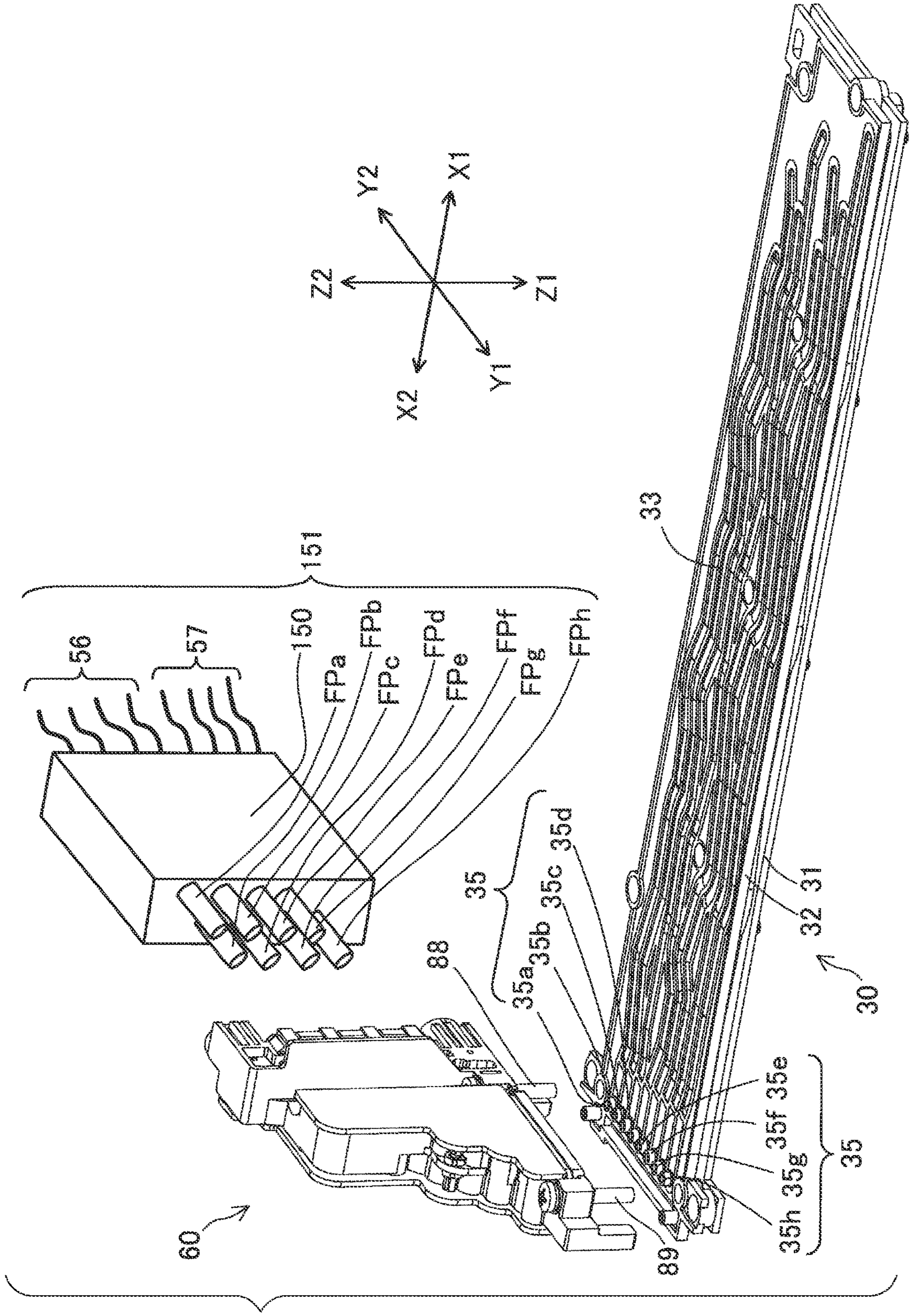
FIG. 3 is an exploded perspective view of a common flow-path member, a flow-path coupling member, and an external flow-path member.

FIG. 2 is an exploded perspective view of the head unit 20. FIG. 3 is an exploded perspective view of the common flow-path member 30, the flow-path coupling member 60, and an external flow-path member 151. As illustrated in FIG. 2, the head unit 20 includes the plurality of liquid ejecting heads 10, a base member 22, the common flow-path member 30, and the flow-path coupling member 60. The flow-path member 30 is an example of a first flow-path member, and the external flow-path member 151 is an example of a second flow-path member. The flow-path coupling member 60 and the liquid ejecting heads 10 are located on both sides of the common flow-path member 30.

The base member 22 supports the plurality of liquid ejecting heads 10 and the common flow-path member 30. The bulk of each of the liquid ejecting heads 10 is housed in the base member 22. A portion of the liquid ejecting head 10 on the Z1-direction side including an ejection surface F1 is located outside the base member 22. The ejection surface F1 is exposed to the outside. The common flow-path member 30 is housed in the base member 22. The base member 22 includes a frame portion 23. The frame portion 23 is rectangular as viewed in the Z-axis direction. The frame portion 23 includes side walls 24 to 27.

The common flow-path member 30 has a first common flow-path substrate 31 and a second common flow-path substrate 32 stacked in the Z-axis direction. The first common flow-path substrate 31 is located on the liquid-ejecting-head 10 side. The second common flow-path substrate 32 is located on the flow-path-coupling-member 60 side. The second common flow-path substrate 32 includes a plurality of flow-path pipes 35 protruding on the flow-path coupling member 60 side. The flow-path pipes 35 are coupled to the flow-path coupling member 60. The common flow-path member 30 includes a plurality of internal flow paths 33 communicating with the respective flow-path pipes 35. The internal flow paths 33 are formed in the common flow-path member 30 by stacking the first common flow-path substrate 31 and the second common flow-path substrate 32. The internal flow paths 33 are formed, for example, by grooves formed in the first common flow-path substrate 31 and the second common flow-path substrate 32 that encloses these grooves. Some of the plurality of internal flow paths 33 are for supplying the liquid supplied from the flow-path coupling member 60 to the liquid ejecting heads 10, while the others are for the liquid to flow from the liquid ejecting heads 10 to the flow-path coupling member 60. The first common flow-path substrate 31 of the common flow-path member 30 further includes, on the surface facing the liquid ejecting head 10, a plurality of common coupling portions coupled to flow-path coupling portions 160 of the liquid ejecting heads 10. The plurality of common coupling portions communicate with the respective internal flow paths 33.

The liquid ejecting head 10 includes the plurality of flow-path coupling portions 160 protruding on the common flow-path member 30 side, a plurality of flow paths (not-illustrated) in the head, and the nozzles NZ illustrated in FIG. 1. The plurality of flow-path coupling portions 160 communicate with the respective flow paths in the head. The plurality of flow paths in the head communicate with the respective nozzles NZ. The liquid ejecting head 10 further includes a connector 19. The connector 19 is coupled to electrical paths to be electrically coupled to the control unit 3 illustrated in FIG. 1.

As illustrated in FIG. 3, the plurality of flow-path pipes 35 of the common flow-path member 30 are coupled to respective first-face coupling portions 93, described later, of the flow-path coupling member 60. The plurality of flow-path pipes 35 are a first flow-path pipe 35*a*, a second flow-path pipe 35*b*, a third flow-path pipe 35*c*, a fourth flow-path pipe 35*d*, a fifth flow-path pipe 35*e*, a sixth flow-path pipe 35*f*, a seventh flow-path pipe 35*g*, and an eighth flow-path pipe 35*h*. In the present embodiment, the first flow-path pipe 35*a*, the second flow-path pipe 35*b*, the fifth flow-path pipe 35*e*, and the sixth flow-path pipe 35*f* are flow paths for collecting liquid from the liquid ejecting heads 10. The third flow-path pipe 35*c*, the fourth flow-path pipe 35*d*, the seventh flow-path pipe 35*g*, and the eighth flow-path pipe 35*h* are flow paths for supplying liquid to the liquid ejecting heads 10. Specifically, the first flow-path pipe 35*a* enables cyan ink that flows inside the common flow-path member 30 to flow into the flow-path coupling member 60 to collect cyan ink from the liquid ejecting heads 10. The second flow-path pipe 35*b* enables magenta ink that flows inside the common flow-path member 30 to flow into the flow-path coupling member 60 to collect magenta ink from the liquid ejecting heads 10. The third flow-path pipe 35*c* enables cyan ink that flows inside the flow-path coupling member 60 to flow into the common flow-path member 30 to supply cyan ink to the liquid ejecting heads 10. The fourth flow-path pipe 35*d* enables magenta ink that flows inside the flow-path coupling member 60 to flow into the common flow-path member 30 to supply magenta ink to the liquid ejecting heads 10. The fifth flow-path pipe 35*e* enables yellow ink that flows inside the common flow-path member 30 to flow into the flow-path coupling member 60 to collect yellow ink from the liquid ejecting heads 10. The sixth flow-path pipe 35*f* enables black ink that flows inside the common flow-path member 30 to flow into the flow-path coupling member 60 to collect black ink from the liquid ejecting heads 10. The seventh flow-path pipe 35*g* enables yellow ink that flows inside the flow-path coupling member 60 to flow into the common flow-path member 30 to supply yellow ink to the liquid ejecting heads 10. The eighth flow-path pipe 35*h* enables black ink that flows inside the flow-path coupling member 60 to flow into the common flow-path member 30 to supply black ink to the liquid ejecting heads 10.

The flow-path coupling member 60 is fixed to the common flow-path member 30 with a first fixing member 88 and a second fixing member 89. The first fixing member 88 and the second fixing member 89 are, for example, screws.

As illustrated in FIG. 3, the external flow-path member 151 is located in the Y2 direction relative to the flow-path coupling member 60. The external flow-path member 151 includes a flow-path forming case 150, a plurality of flow-path pipes FP protruding from the flow-path forming case 150, and a plurality of supply flow paths 56 and a plurality of collection flow paths 57 coupled to the flow-path forming case 150. The plurality of flow-path pipes FP are a first flow-path pipe FPa, a second flow-path pipe FPb, a third flow-path pipe FPc, a fourth flow-path pipe FPd, a fifth flow-path pipe FPe, a sixth flow-path pipe FPf, a seventh flow-path pipe FPg, and an eighth flow-path pipe FPh. The plurality of flow-path pipes FPa to FPh each have an interior flow path through which ink flows. The flow-path forming case 150 contains a plurality of flow paths (not illustrated) for connecting each of the flow-path pipes FPa to FPh to the corresponding one of the supply flow paths 56 and collection flow paths 57. Through each of the supply flow paths 56, one type of ink out of black, yellow, magenta, and cyan flows from the supply-side sub-tank 52 to the flow-path forming case 150. Through each of the collection flow paths 57, one type of ink out of black, yellow, magenta, and cyan flows from the flow-path forming case 150 to the collection-side sub-tank 53.

Specifically, the first flow-path pipe FPa enables cyan ink that flows inside the flow-path forming case 150 to flow into the flow-path coupling member 60 to supply cyan ink stored in the supply-side sub-tank 52 to the liquid ejecting heads 10. The first flow-path pipe FPa is coupled to the supply flow path 56 for cyan ink via a flow path formed inside the flow-path forming case 150.

The second flow-path pipe FPb enables magenta ink that flows inside the flow-path forming case 150 to flow into the flow-path coupling member 60 to supply magenta ink stored in the supply-side sub-tank 52 to the liquid ejecting heads 10. The second flow-path pipe FPb is coupled to the supply flow path 56 for magenta ink via a flow path formed inside the flow-path forming case 150.

The third flow-path pipe FPc enables cyan ink that flows inside the flow-path coupling member 60 to flow into the flow-path forming case 150 to collect cyan ink that flows inside the liquid ejecting heads 10 and send it to the collection-side sub-tank 53. The third flow-path pipe FPc is coupled to the collection flow path 57 for cyan ink via a flow path formed inside the flow-path forming case 150.

The fourth flow-path pipe FPd enables magenta ink that flows inside the flow-path coupling member 60 to flow into the flow-path forming case 150 to collect magenta ink that flows inside the liquid ejecting heads 10 and send it to the collection-side sub-tank 53. The fourth flow-path pipe FPd is coupled to the collection flow path 57 for magenta ink via a flow path formed inside the flow-path forming case 150.

The fifth flow-path pipe FPe enables yellow ink that flows inside the flow-path forming case 150 to flow into the flow-path coupling member 60 to supply yellow ink stored in the supply-side sub-tank 52 to the liquid ejecting heads 10. The fifth flow-path pipe FPe is coupled to the supply flow path 56 for yellow ink via a flow path formed inside the flow-path forming case 150.

The sixth flow-path pipe FPf enables black ink that flows inside the flow-path forming case 150 to flow into the flow-path coupling member 60 to supply black ink stored in the supply-side sub-tank 52 to the liquid ejecting heads 10.

The sixth flow-path pipe FPf is coupled to the supply flow path 56 for black ink via a flow path formed inside the flow-path forming case 150.

The seventh flow-path pipe FPg enables yellow ink that flows inside the flow-path coupling member 60 to flow into the flow-path forming case 150 to collect yellow ink that flows inside the liquid ejecting heads 10 and send it to the collection-side sub-tank 53. The seventh flow-path pipe FPg is coupled to the collection flow path 57 for yellow ink via a flow path formed inside the flow-path forming case 150.

The eighth flow-path pipe FPh enables black ink that flows inside the flow-path coupling member 60 to flow into the flow-path forming case 150 to collect black ink that flows inside the liquid ejecting heads 10 and send it to the collection-side sub-tank 53. The eighth flow-path pipe FPh is coupled to the collection flow path 57 for black ink via a flow path formed inside the flow-path forming case 150.

The external flow-path member 151 is detachably attached to the flow-path coupling member 60. Specifically, by moving the external flow-path member 151 in the Y1 direction toward the flow-path coupling member 60, the flow-path pipes FPa to FPh are inserted into the respective second-face coupling portions 92 of the flow-path coupling member 60 described later. By moving the external flow-path member 151 in the Y2 direction from the flow-path coupling member 60, the flow-path pipes FPa to FPh are pulled out of the respective second-face coupling portions 92 of the flow-path coupling member 60.

Figure 4:
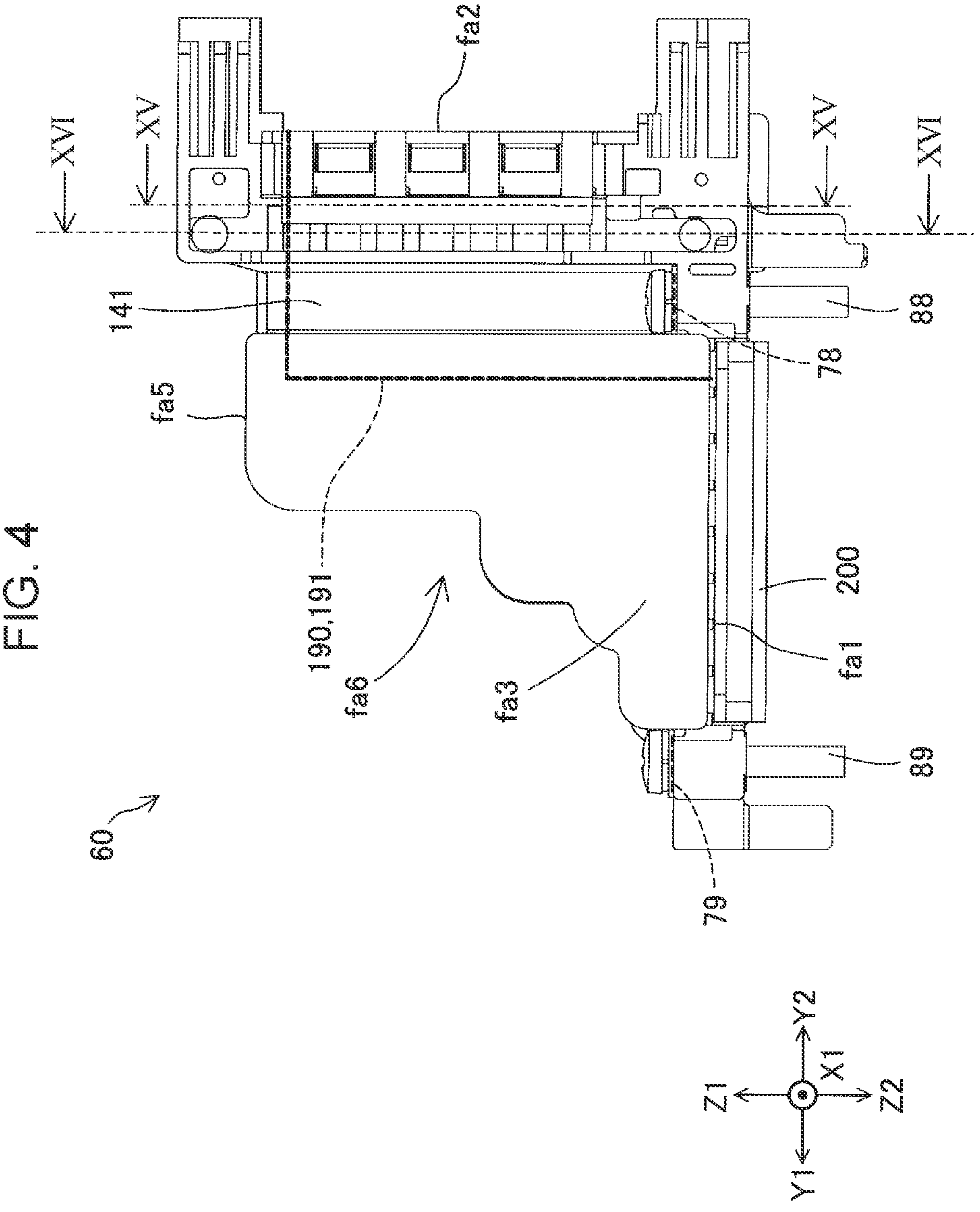
FIG. 4 is a diagram of the flow-path coupling member viewed in the direction of a third outer surface.
Figure 5:
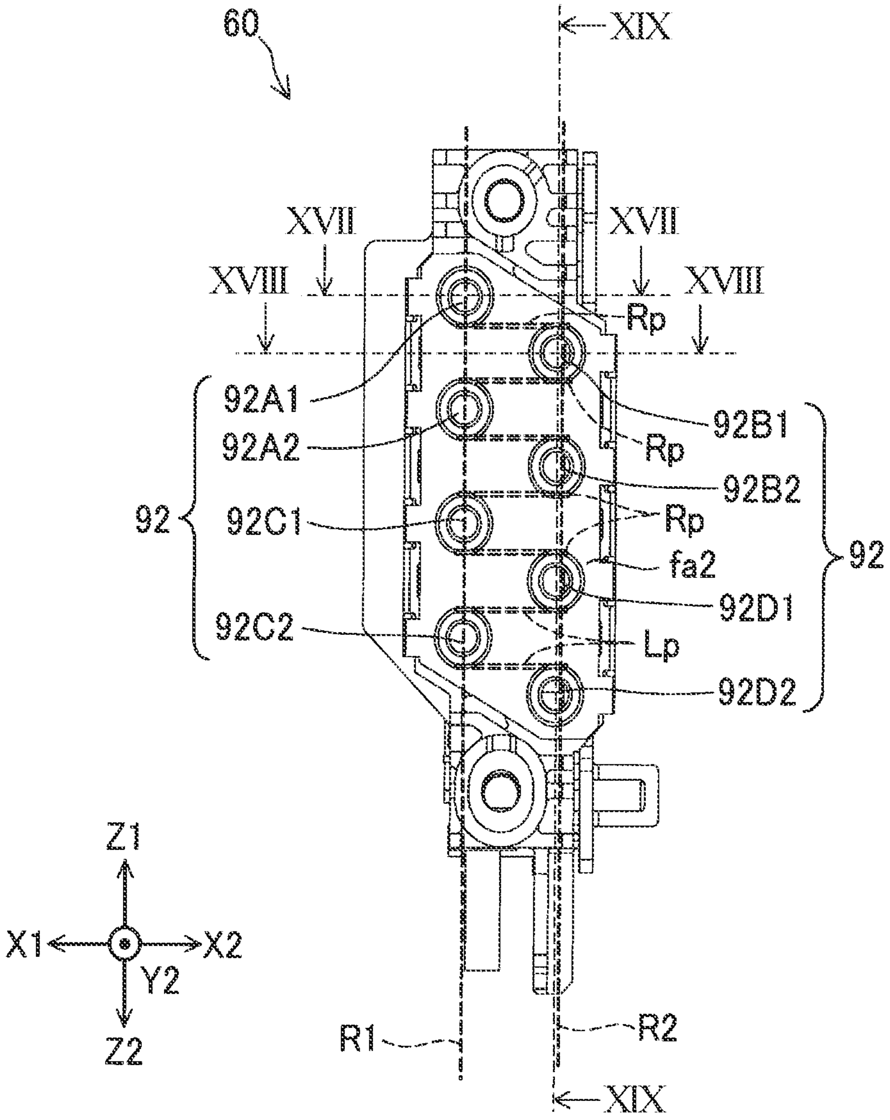
FIG. 5 is a diagram of the flow-path coupling member viewed in the direction of a second outer surface.
Figure 6:
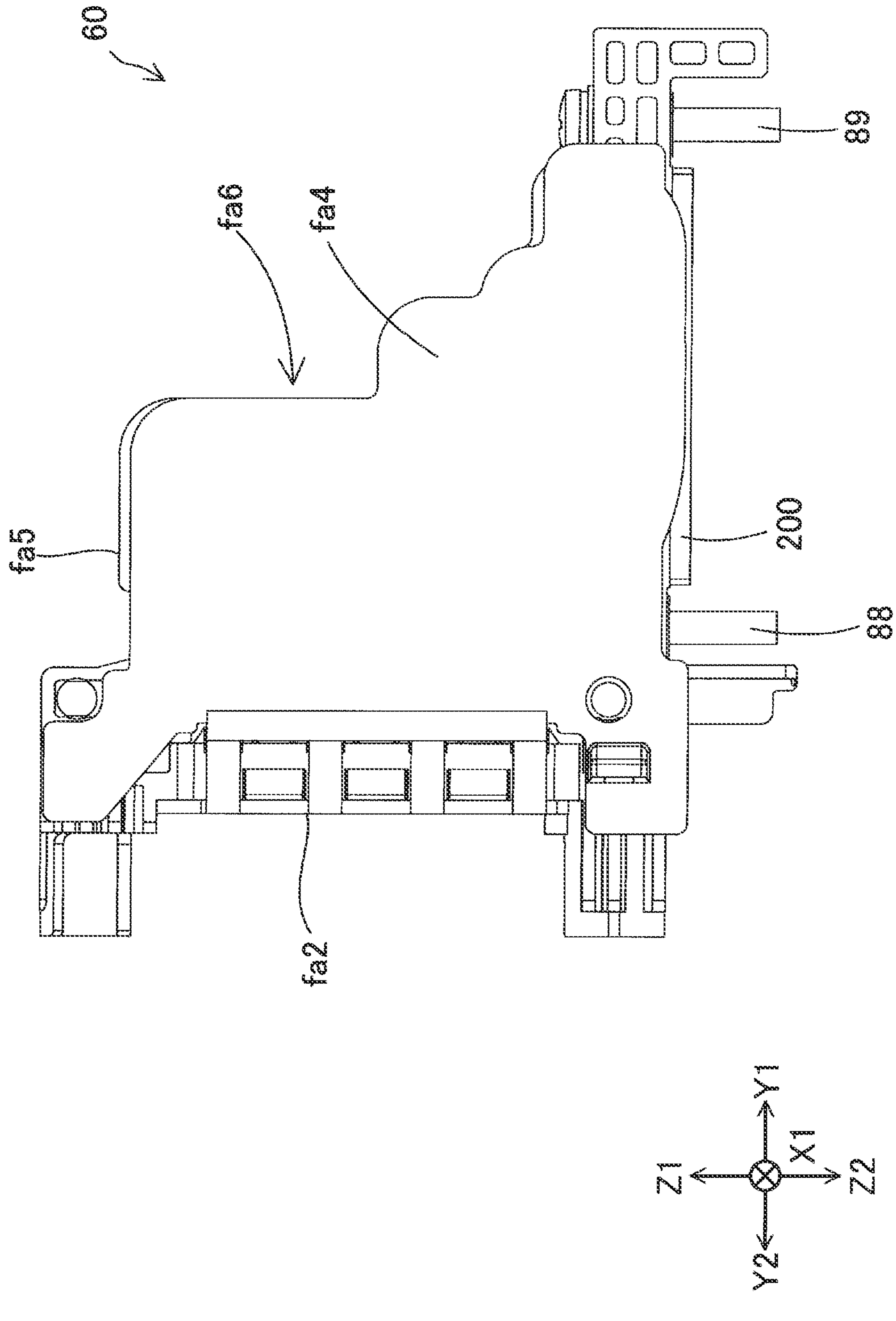
FIG. 6 is a diagram of the flow-path coupling member viewed in the direction of a fourth outer surface.
Figure 7:
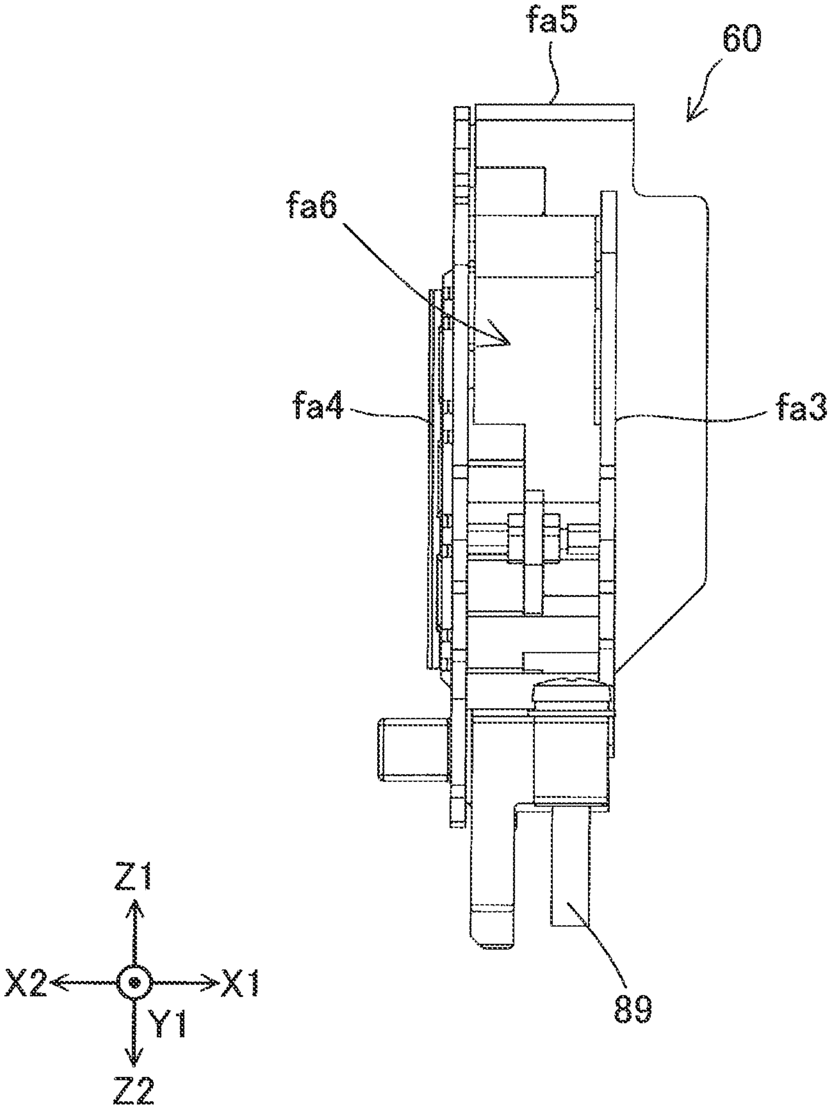
FIG. 7 is a diagram of the flow-path coupling member viewed in the direction of a sixth surface.
Figure 8:
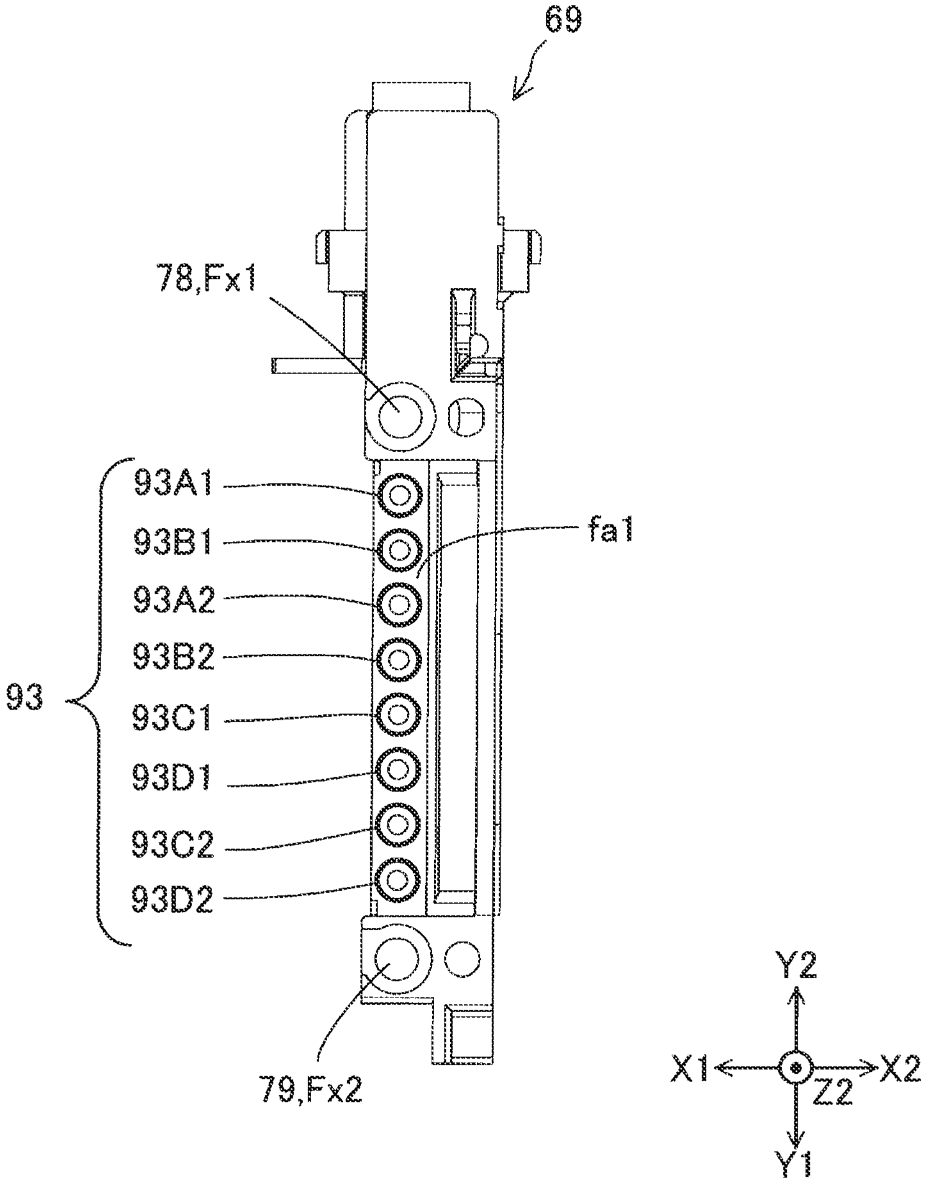
FIG. 8 is a diagram of the flow-path coupling member viewed in the direction of a first outer surface.
Figure 9:
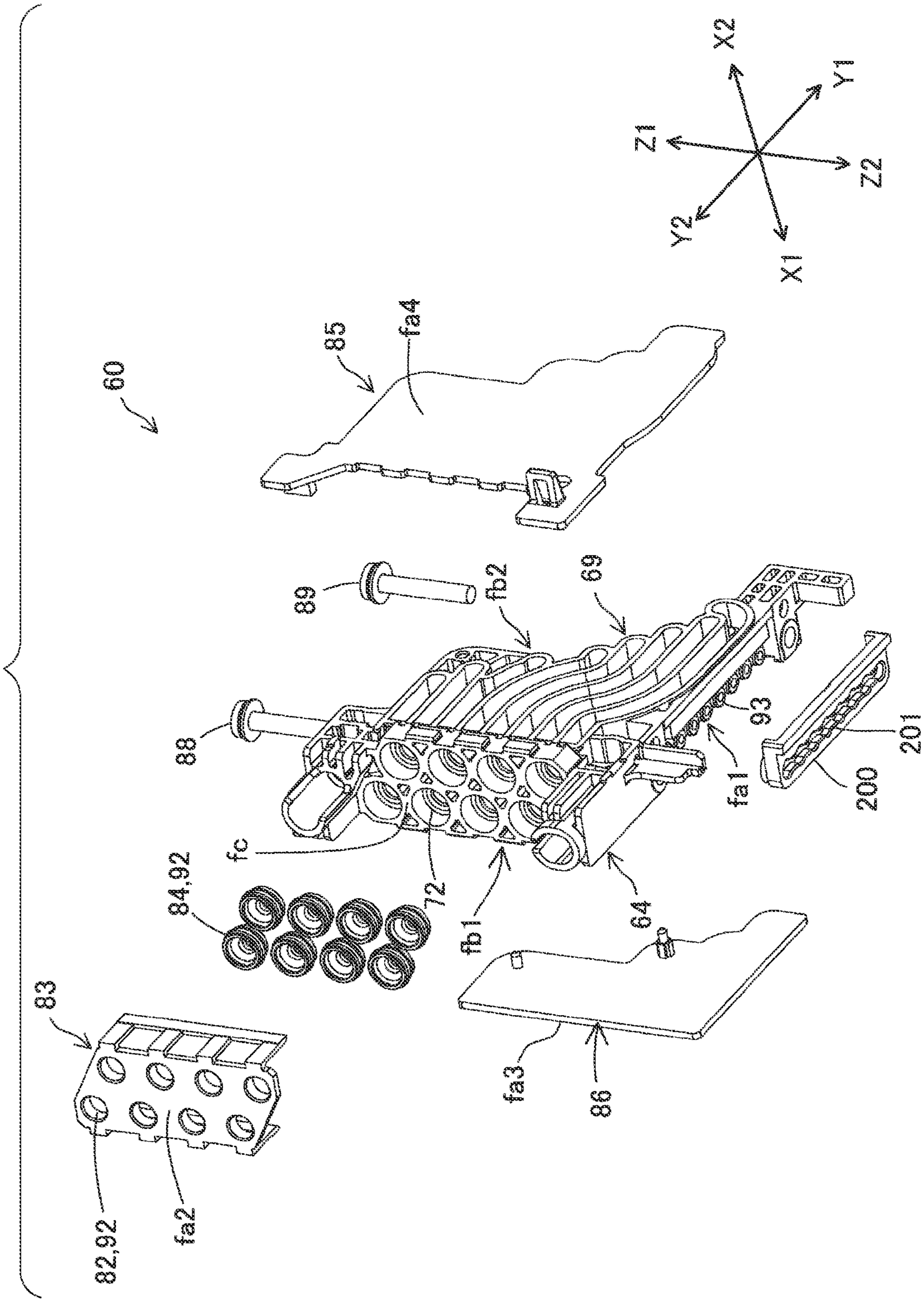
FIG. 9 is an exploded perspective view of the flow-path coupling member.

FIG. 4 is a diagram of the flow-path coupling member 60 viewed in the direction of a third outer surface Fa3. FIG. 5 is a diagram of the flow-path coupling member 60 viewed in the direction of a second outer surface Fa2. FIG. 6 is a diagram of the flow-path coupling member 60 viewed in the direction of a fourth outer surface Fa4. FIG. 7 is a diagram of the flow-path coupling member 60 viewed in the direction of a sixth surface Fa6. FIG. 8 is a diagram of the flow-path coupling member 60 viewed in the direction of a first outer surface fa1. FIG. 9 is an exploded perspective view of the flow-path coupling member 60. FIGS. 4 to 7 and FIG. 9 illustrate the flow-path coupling member with a first-face bushing 200, which is an intermediate member illustrated in FIG. 9, attached. Hereinafter, the Z2 direction is an example of a first direction, the Y2 direction is an example a second direction, and the X2 direction is an example of a third direction.

As illustrated in FIGS. 4 to 7, the flow-path coupling member 60 is in the form of a plate shape whose smallest dimension is in the X-axis direction. As illustrated in FIG. 4, the flow-path coupling member 60 includes inter-member flow paths 190 that connect the common flow-path member 30 and the external flow-path member 151. Although the flow-path coupling member 60 has a plurality of inter-member flow paths 190, eight in the present embodiment, FIG. 4 schematically illustrates one of the inter-member flow paths 190. One end of the inter-member flow path 190 is a first-face coupling portion 93 illustrated in FIG. 8. The other end of the inter-member flow path 190 is a second-face coupling portion 92 illustrated in FIG. 5. The flow-path coupling member 60 has as many first-face coupling portions 93 and second-face coupling portions 92 as the number of inter-member flow paths 190, eight in the present embodiment. The inter-member flow paths 190 further have a plurality of coupling flow paths 191, illustrated in FIG. 4, located between the first-face coupling portions 93 and the respective second-face coupling portions 92 and connecting the first-face coupling portions 93 and the respective second-face coupling portions 92. Specifically, the flow-path coupling member 60 has a plurality of coupling flow paths 191 each connecting one of the first-face coupling portions 93 and the corresponding one of the second-face coupling portions 92. For easier understanding, FIG. 4 schematically illustrates one coupling flow path 191.

The flow-path coupling member 60 has the first outer surface fa1 illustrated in FIGS. 4 and 8, the second outer surface fa2 illustrated in FIGS. 4 and 5, the third outer surface fa3 illustrated in FIG. 4, and the fourth outer surface fa4, a fifth outer surface fa5, and a sixth outer surface fa6 illustrated in FIG. 6. The concept of the outer surfaces fa1 to fa6 includes not only planar surfaces but also surfaces with recesses and protrusions and curved surfaces.

As illustrated in FIG. 9, the first-face bushing 200 is attached to the first outer surface fa1. The first outer surface fa1 faces the Z2 direction. In other words, the direction normal to the first outer surface fa1 is the Z2 direction. In the present embodiment, the first outer surface fa1 is a planar surface on which the cylindrical first-face coupling portions 93 illustrated in FIG. 8 are provided.

As illustrated in FIGS. 5 and 9, the second outer surface fa2 faces the Y2 direction orthogonal to the Z2 direction. In other words, the direction normal to the second outer surface fa2 is the Y2 direction. In the present embodiment, the second outer surface fa2 is a planar surface that is formed by a cover member 83 illustrated in FIG. 9 and on which the second-face coupling portions 92 which are circular openings are formed. Although the Z2 direction faced by the first outer surface fa1 and the Y2 direction faced by the second outer surface fa2 are orthogonal to each other in the present embodiment, the present disclosure is not limited to this configuration. These directions may intersect each other. For example, the Z2 direction and the Y2 direction may intersect each other at an angle larger than or equal to 80° and smaller than 90°.

As illustrated in FIGS. 4 and 7, the third outer surface fa3 faces the X1 direction orthogonal to the Z2 direction and the Y2 direction. In other words, the direction normal to the third outer surface fa3 is the X1 direction. In the present embodiment, the third outer surface fa3 is a planar surface formed by the outer surface of a first sealing substrate 86 illustrated in FIG. 9.

As illustrated in FIGS. 6 and 7, the fourth outer surface fa4 faces the X2 direction opposite to the X1 direction. In other words, the direction normal to the fourth outer surface fa4 is the X2 direction. In the present embodiment, the fourth outer surface fa4 is a planar surface formed by the outer surface of a second sealing substrate 85 illustrated in FIG. 9.

As illustrated in FIG. 6, the fifth outer surface fa5 faces the Z1 direction opposite to the direction faced by the first outer surface fa1. The sixth outer surface fa6 faces the Y1 direction opposite to the direction faced by the second outer surface fa2.

As described above, the flow-path coupling member 60 has the plurality of first-face coupling portions 93 illustrated in FIG. 8 and the plurality of second-face coupling portions 92 illustrated in FIG. 5. The plurality of first-face coupling portions 93 illustrated in FIG. 8 are tubular members provided on the first outer surface fa1. In the present embodiment, the number of the first-face coupling portions 93 is eight. The plurality of first-face coupling portions 93 are coupled to the respective flow-path pipes 35 which are flow paths of the common flow-path member 30 illustrated in FIG. 3.

As illustrated in FIG. 8, the plurality of first-face coupling portions 93 are arranged in a row in the Y2 direction. The flow-path coupling member 60 has a first insertion opening 78 into which the first fixing member 88 is inserted and a second insertion opening 79 into which the second fixing member 89 is inserted. The first insertion opening 78 and the second insertion opening 79 are formed in the surface facing the common flow-path member 30. The area where the first insertion opening 78 is located is a first fixation position Fx1 at which the flow-path coupling member 60 is fixed to the common flow-path member 30. The area where the second insertion opening 79 is located is a second fixation position Fx2 at which the flow-path coupling member 60 is fixed to the common flow-path member 30. The second fixation position Fx2 is a position different from the first fixation position Fx1 and is located away from the first fixation position Fx1 in the Y2 direction, which is a Y-axis direction. The plurality of first-face coupling portions 93 are located between the first fixation position Fx1 and the second fixation position Fx2 in the Y2 direction. This configuration enables a fixation force between the first fixing member 88 and the second fixing member 89 to act firmly on the coupling portions between the plurality of first-face coupling portions 93 and the flow-path pipes 35 of the common flow-path member 30. This prevents liquid from leaking between the first-face coupling portions 93 and the flow-path pipes 35 of the common flow-path member 30. In the present embodiment, in a view of the flow-path coupling member 60 in the direction of the first outer surface fa1, the plurality of first-face coupling portions 93, the first fixation position Fx1, and the second fixation position Fx2 are aligned in the Y2 direction, which is a Y-axis direction. This configuration enables the fixation force between the first fixing member 88 and the second fixing member 89 to firmly act on the coupling portions between the plurality of first-face coupling portions 93 and the flow-path pipes 35 of the common flow-path member 30.

The insertion direction in which the first fixing member 88 is inserted into the flow-path coupling member 60 and the common flow-path member 30 at the first fixation position Fx1 to fix the flow-path coupling member 60 to the common flow-path member 30 is the Z2 direction. In the present embodiment, by moving the first fixing member 88 toward the first insertion opening 78 along a recessed portion 141 extending in the Z2 direction described later, the first fixing member 88 is inserted into the flow-path coupling member 60 and the common flow-path member 30. Specifically, since the first fixing member 88 can be inserted into the flow-path coupling member 60 and the common flow-path member 30 by moving the first fixing member 88 along the recessed portion 141 in the Z2 direction, it is easy to fix the flow-path coupling member 60 to the common flow-path member 30. For example, a tool such as a screwdriver for fixing the first fixing member 88 can be inserted into the recessed portion 141 illustrated in FIG. 4, and hence, it is easy to perform fixation using the first fixing member 88.

The insertion direction in which the second fixing member 89 is inserted into the flow-path coupling member 60 and the common flow-path member 30 at the second fixation position Fx2 to fix the flow-path coupling member 60 to the common flow-path member 30 is the Z2 direction. In the flow-path coupling member 60 with this configuration, as illustrated in FIG. 4, the dimension in the Z2 direction of the area where the second insertion opening 79 is located is smaller than the dimension in the Z2 direction of the area where the first insertion opening 78 is located. In the present embodiment, no member is provided in the space on the side opposite to the second insertion opening 79 in the Z2 direction. With this configuration, the second fixing member 89 can be inserted easily into the second insertion opening 79 by moving the second fixing member 89 in the Z2 direction. Since a tool such as a screwdriver for fixing the second fixing member 89 can be used in the space on the side opposite to the second insertion opening 79 in the Z2 direction, it is easy to perform fixation using the second fixing member 89.

The plurality of second-face coupling portions 92 illustrated in FIG. 5 are through holes formed in the second outer surface fa2. The number of the second-face coupling portions 92 is eight in the present embodiment. The plurality of second-face coupling portions 92 is arranged in the Z2 direction. Here, "arranged in the Z2 direction" denotes not only the case of being arranged in a row but also the case of being arranged in a plurality of rows oriented in the Z2 direction as long as the second-face coupling portions 92 are located in order in the Z2 direction. The plurality of second-face coupling portions 92 are coupled to the respective flow-path pipes FPa to FPh. The plurality of second-face coupling portions 92 include a first second-face coupling portion 92A1, a second second-face coupling portion 92B1, a third second-face coupling portion 92A2, a fourth second-face coupling portion 92B2, a fifth second-face coupling portion 92C1, a sixth second-face coupling portion 92D1, a seventh second-face coupling portion 92C2, and an eighth second-face coupling portion 92D2. The first second-face coupling portion 92A1 is coupled to the first flow-path pipe FPa illustrated in FIG. 3. The third second-face coupling portion 92A2 is coupled to the third flow-path pipe FPc illustrated in FIG. 3. The second second-face coupling portion 92B1 is coupled to the second flow-path pipe FPb illustrated in FIG. 3. The fourth second-face coupling portion 92B2 is coupled to the fourth flow-path pipe FPd illustrated in FIG. 3. The fifth second-face coupling portion 92C1 is coupled to the fifth flow-path pipe FPe illustrated in FIG. 3. The seventh second-face coupling portion 92C2 is coupled to the seventh flow-path pipe FPg illustrated in FIG. 3. The sixth second-face coupling portion 92D1 is coupled to the sixth flow-path pipe FPf illustrated in FIG. 3. The eighth second-face coupling portion 92D2 is coupled to the eighth flow-path pipe FPh illustrated in FIG. 3.

The plurality of second-face coupling portions 92A1 to 92D2 are arranged in two rows R1 and R2 in the Z2 direction. The two rows R1 and R2 are located side by side in the X2 direction. The row R2 is shifted from the row R1 in the Z-axis direction, and thus the plurality of second-face coupling portions 92A1 to 92D2 are arranged in a staggered manner in the Z-axis direction. The row R1 includes the first second-face coupling portion 92A1, the third second-face coupling portion 92A2, the fifth second-face coupling portion 92C1, and the seventh second-face coupling portion 92C2 spaced at regular intervals. The row R2 includes the second second-face coupling portion 92B1, the fourth second-face coupling portion 92B2, the sixth second-face coupling portion 92D1, and the eighth second-face coupling portion 92D2 spaced at regular intervals. The four second-face coupling portions 92B1, 92B2, 92D1, and 92D2 in the row R2 are partially shifted in the Z2 direction from the four second-face coupling portions 92A1, 92A2, 92C1, and 92C2 in the row R1. Each of the second-face coupling portions 92A1, 92A2, 92C1, and 92C2 included in the one row R1 and a certain one or certain ones of the second-face coupling portions 92B1, 92B2, 92D1, and 92D2 included in the other row R2 located side by side in the X2 direction are partially overlapped in the X2 direction in areas Rp. For example, a portion of the first second-face coupling portion 92A1 at the end in the Z2 direction and a portion of the second second-face coupling portion 92B1 at the end in the direction opposite to the Z2 direction overlap each other in areas Rp as viewed in the X2 direction, and the areas Rp are at the same position in the Z2 direction. For example, a portion of the third second-face coupling portion 92A2 at the end in the Z2 direction and a portion of the fourth second-face coupling portion 92B2 at the end in the direction opposite to the Z2 direction overlap each other in areas Rp as viewed in the X2 direction, and the areas Rp are at the same position in the Z2 direction. With the arrangement of the plurality of second-face coupling portions 92A1 to 92D2 described above, the second outer surface fa2 in the Z1 direction can be small, thereby preventing an increase in the size of the flow-path coupling member 60 in the Z1 direction.

As illustrated in FIGS. 4 and 5, each of the second-face coupling portions 92 is located progressively farther from the first outer surface fa1 in the Z2 direction in the order of the first second-face coupling portion 92A1 to the eighth second-face coupling portion 92D2. For example, the first second-face coupling portion 92A1 is farther than the second second-face coupling portion 92B1 in the Z2 direction from the first outer surface fa1. The plurality of first-face coupling portions 93 illustrated in FIG. 8 include a first first-face coupling portion 93A1, a second first-face coupling portion 93B1, a third first-face coupling portion 93A2, a fourth first-face coupling portion 93B2, a fifth first-face coupling portion 93C1, a sixth first-face coupling portion 93D1, a seventh first-face coupling portion 93C2, and an eighth first-face coupling portion 93D2. As illustrated in FIGS. 4 and 8, each of the first-face coupling portions 93 is located progressively closer to the second outer surface fa2 in the Y2 direction in the order of the first first-face coupling portion 93A1 to the eighth first-face coupling portion 93D2. For example, the first first-face coupling portion 93A1 is closer than the second first-face coupling portion 93B1 in the Y2 direction to the second outer surface fa2. This configuration reduces variation in the length of the coupling flow path 191 connecting a second-face coupling portion 92 and the first-face coupling portion 93 associated with the second-face coupling portion 92.

The first first-face coupling portion 93A1 is coupled to the first flow-path pipe 35*a* illustrated in FIG. 3. The second first-face coupling portion 93B1 is coupled to the second flow-path pipe 35*b* illustrated in FIG. 3. The third first-face coupling portion 93A2 is coupled to the third flow-path pipe 35*c* illustrated in FIG. 3. The fourth first-face coupling portion 93B2 is coupled to the fourth flow-path pipe 35*d* illustrated in FIG. 3. The fifth first-face coupling portion 93C1 is coupled to the fifth flow-path pipe 35*e* illustrated in FIG. 3. The sixth first-face coupling portion 93D1 is coupled to the sixth flow-path pipe 35*f* illustrated in FIG. 3. The seventh first-face coupling portion 93C2 is coupled to the seventh flow-path pipe 35*g* illustrated in FIG. 3. The eighth first-face coupling portion 93D2 is coupled to the eighth flow-path pipe 35*h* illustrated in FIG. 3.

The first first-face coupling portion 93A1 communicates with the first second-face coupling portion 92A1 through a coupling flow path 191. The second first-face coupling portion 93B1 communicates with the second second-face coupling portion 92B1 through a coupling flow path 191. The third first-face coupling portion 93A2 communicates with the third second-face coupling portion 92A2 through a coupling flow path 191. The fourth first-face coupling portion 93B2 communicates with the fourth second-face coupling portion 92B2 through a coupling flow path 191. The fifth first-face coupling portion 93C1 communicates with the fifth second-face coupling portion 92C1 through a coupling flow path 191. The sixth first-face coupling portion 93D1 communicates with the sixth second-face coupling portion 92D1 through a coupling flow path 191. The seventh first-face coupling portion 93C2 communicates with the seventh second-face coupling portion 92C2 through a coupling flow path 191. The eighth first-face coupling portion 93D2 communicates with the eighth second-face coupling portion 92D2 through a coupling flow path 191.

As illustrated in FIG. 9, the flow-path coupling member 60 includes a flow-path substrate 69 serving as a main body, the first sealing substrate 86, the second sealing substrate 85, second-face bushings 84, and the cover member 83. Each of the first sealing substrate 86 and the second sealing substrate 85 is a plate-shaped member.

The flow-path substrate 69 has a first side surface fb1 to which the first sealing substrate 86 serving as the third outer surface fa3 is welded and a second side surface fb2 to which the second sealing substrate 85 serving as the fourth outer surface fa4 is welded. The first side surface fb1 and the second side surface fb2 face the directions opposite to each other in the X2 direction, which is an X-axis direction orthogonal to both the Z2 direction and the Y2 direction. In other words, the direction normal to the first side surface fb1 is the X1 direction, and the direction normal to the second side surface fb2 is the X2 direction. The first side surface fb1 and the second side surface fb2 have grooves and through holes described later. The first sealing substrate 86 and the second sealing substrate 85 are laser-welded to the flow-path substrate 69 so as to cover these grooves and through holes, thereby forming part of the inter-member flow paths 190.

As illustrated in FIG. 9, the flow-path substrate 69 further includes a flow-path forming surface fc having a plurality of openings 72 open in the Y2 direction. The flow-path forming surface fc faces the Y2 direction. In other words, the direction normal to the flow-path forming surface fc is the Y2 direction. In the present embodiment, the number of openings 72 is eight. Each of the openings 72 serves as part of the corresponding inter-member flow path 190. A second-face bushing 84 is press-fitted into each of the openings 72. The second-face bushing 84 has an annular shape and is an elastic member made of an elastomer or the like. The cover member 83 is fixed to the flow-path substrate 69 so as to cover the second-face bushings 84. The cover member 83 is fixed to the flow-path substrate 69 by, for example, snap-fitting. The cover member 83 has a plurality of through holes 82. The plurality of through holes 82 are open in the Y2 direction. The cover member 83 is fixed to the flow-path substrate 69 such that each through hole 82 and the opening of the corresponding second-face bushing 84 are aligned in the Y2 direction. The tubular flow-path pipes FP illustrated in FIG. 3 are inserted into the respective through holes 82 and second-face bushings 84. With this configuration, the outer peripheral surface of the flow-path pipe FP is in close contact with the inner peripheral surface of the second-face bushing 84, so that the flow-path pipe FP and the flow-path coupling member 60 are coupled in a liquid-tight manner. In other words, the through holes 82 and the second-face bushings 84 serve as the second-face coupling portions 92. Note that the flow-path pipes FP may have needle-like shapes.

The flow-path substrate 69 is made of a material having light absorptivity for the laser light used for laser welding. Here, "laser light" denotes a laser for plastic, used for laser welding, examples of which include a fiber laser with a wavelength of 1070 nm, a YAG (yttrium-aluminum-garnet crystal) laser with a wavelength of 1064 nm, and a laser diode (LD) with a wavelength of 808 nm, 840 nm, or 940 nm. Other examples include a semiconductor laser with a wavelength of 635 to 940 nm, a Nd:YAG laser with a wavelength of 1060 nm, and a $CO_2$ laser with a wavelength of 9600 nm or 10600 nm.

Here, "a material having light absorptivity for laser light" refers to a material that has a lower laser-light transmittance than the first sealing substrate 86 and the second sealing substrate 85 and that generates heat by receiving laser light and can be welded to the first sealing substrate 86 and the second sealing substrate 85. The material of the flow-path substrate 69 is not limited to materials having a laser-light absorption rate of 100% and may be a material having an absorption rate lower than 100%. Since the first sealing substrate 86 and the second sealing substrate 85 have higher laser-light transmittance than the flow-path substrate 69, the first sealing substrate 86 and the second sealing substrate 85 can be members more transparent than the flow-path substrate 69. With this configuration, the state of the inter-member flow paths 190 of the flow-path coupling member 60 can be easily checked from outside of the flow-path coupling member 60, for example, from outside of the first sealing substrate 86 and the second sealing substrate 85. Specifically, it is easy to check, for example, if the inter-member flow paths 190 are filled with ink or if bubbles are formed in the ink.

Examples of materials for the flow-path substrate 69, the first sealing substrate 86, and the second sealing substrate 85 that can be used for laser welding include polypropylene, polybutylene terephthalate, polyethylene terephthalate, and polyphenylene sulfide.

The flow-path substrate 69 having light absorptivity for laser light can be formed by adding, for example, black pigments or the like, such as carbon black, to the above plastics.

The first-face bushing 200 is an elastic member made of an elastomer or the like. The first-face bushing 200 has through holes 201 extending through the first-face bushing 200 in the Z2 direction. The through holes 201 are aligned in the Y2 direction, which is a Y-axis direction, over the area where the plurality of first-face coupling portions 93 are located. The first-face bushing 200 is fixed by being held between the flow-path coupling member 60 and the common flow-path member 30. The first-face bushing 200 is fixed such that the through holes 201 fully overlap the plurality of first-face coupling portions 93 as the flow-path coupling member 60 and the first-face bushing 200 are viewed in the Z2 direction. The first-face bushing 200 has a sealing function for preventing liquid from leaking between the flow-path pipes 35 illustrated in FIG. 3 and the first-face coupling portions 93 illustrated in FIG. 8.

Figure 10:
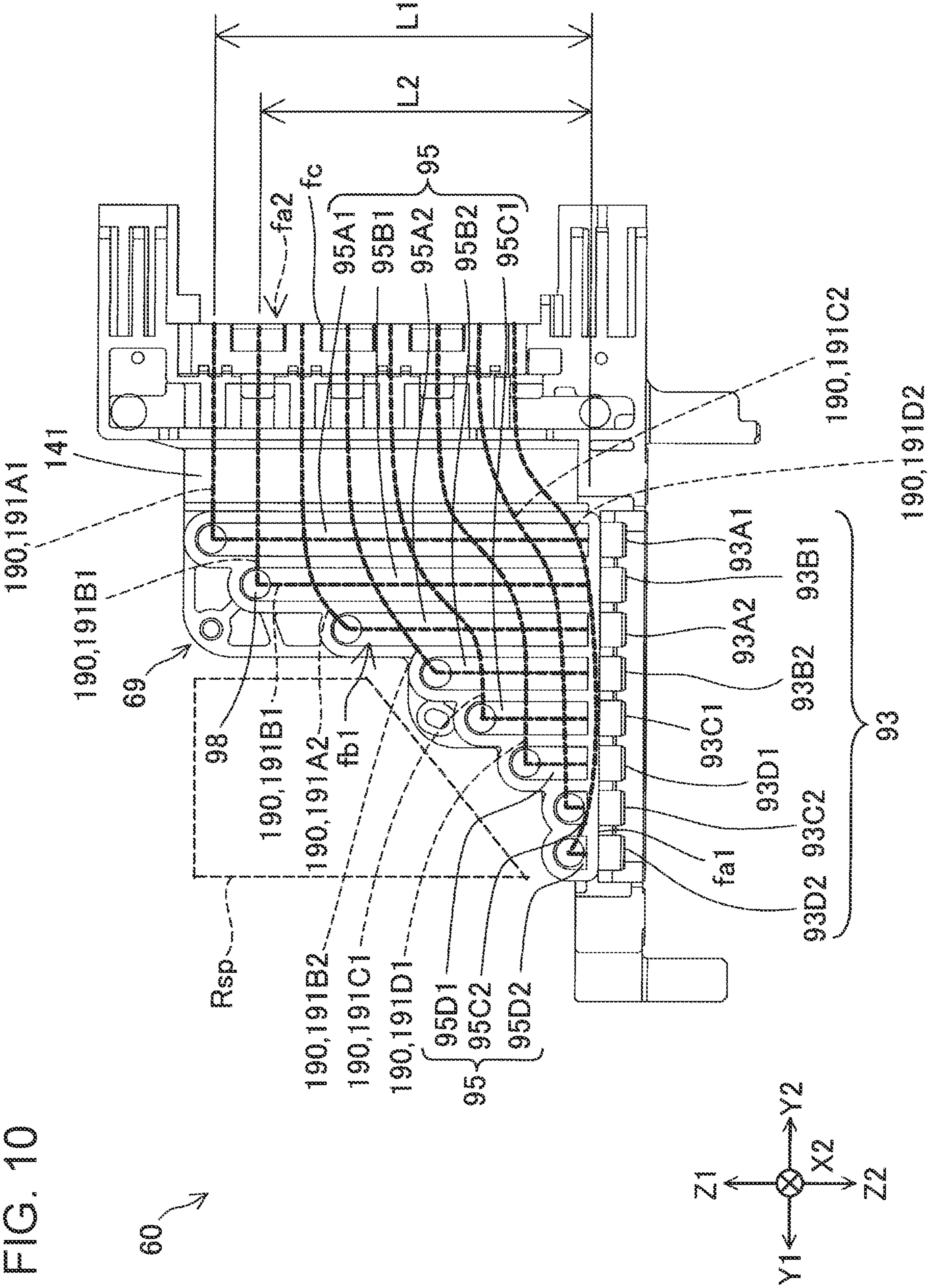
FIG. 10 is a diagram of a flow-path substrate viewed in the direction of a first side surface.
Figure 11:
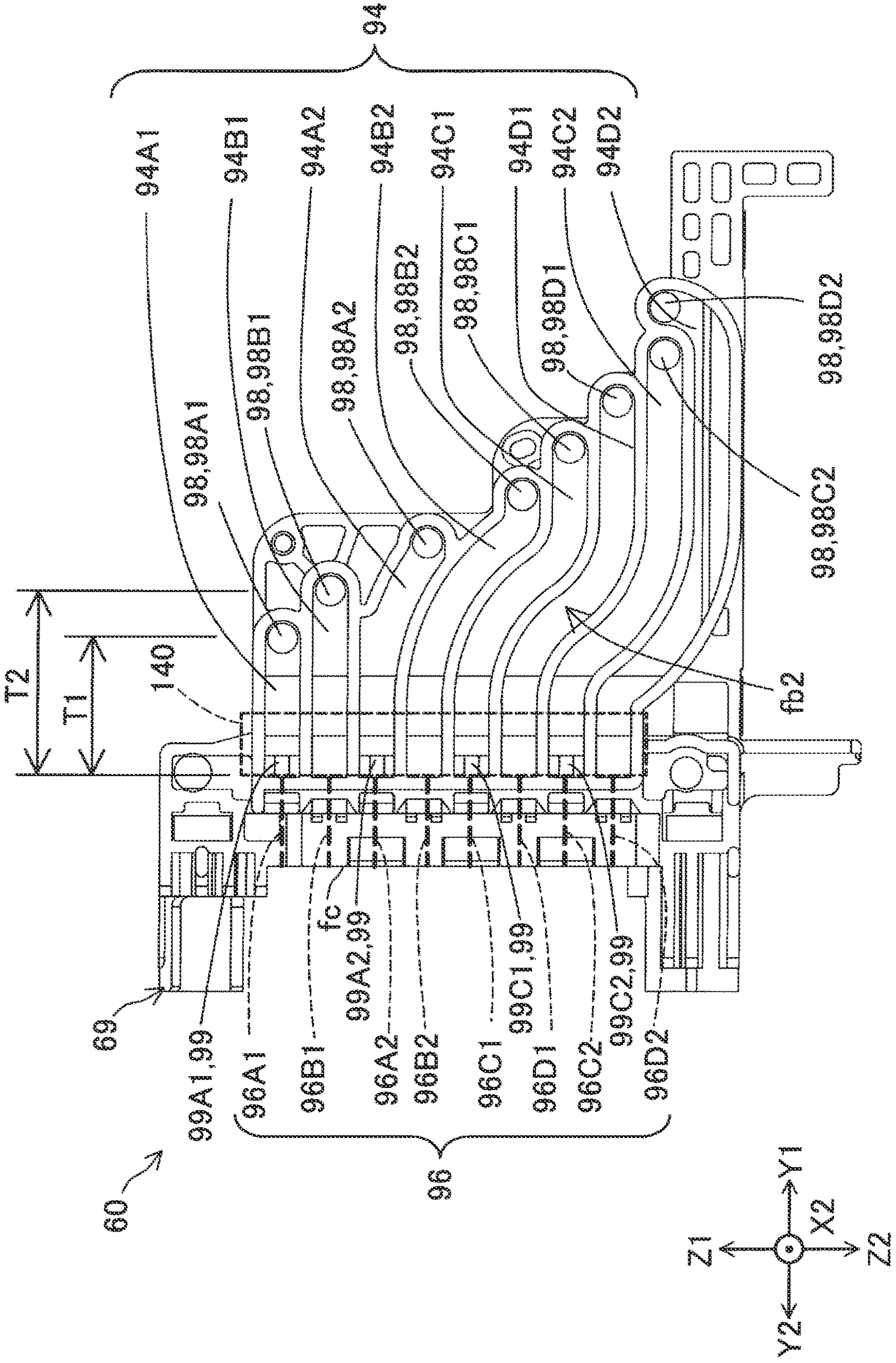
FIG. 11 is a diagram of the flow-path substrate viewed in the direction of a second side surface.

FIG. 10 is a diagram of the flow-path substrate 69 viewed in the direction of the first side surface fb1. FIG. 11 is a diagram of the flow-path substrate 69 viewed in the direction of the second side surface fb2.

As illustrated in FIG. 10, the flow-path coupling member 60 has the plurality of coupling flow paths 191. The plurality of coupling flow paths 191 are defined by the flow-path substrate 69, the first sealing substrate 86, and the second sealing substrate 85. For example, the plurality of coupling flow paths 191 include openings formed in the flow-path substrate 69 and grooves formed in the flow-path substrate 69 and covered with the first sealing substrate 86 and the second sealing substrate 85. The plurality of coupling flow paths 191 extend three-dimensionally. The plurality of coupling flow paths 191 include a first coupling flow path 191A1, a second coupling flow path 191B1, a third coupling flow path 191A2, a fourth coupling flow path 191B2, a fifth coupling flow path 191C1, a sixth coupling flow path 191D1, a seventh coupling flow path 191C2, and an eighth coupling flow path 191D2.

The first coupling flow path 191A1 has one end coupled to the first second-face coupling portion 92A1 illustrated in FIG. 5 and the other end coupled to the first first-face coupling portion 93A1 illustrated in FIG. 10, so that the two coupling portions 92A1 and 93A1 communicate with each other. The second coupling flow path 191B1 has one end coupled to the second second-face coupling portion 92B1 illustrated in FIG. 5 and the other end coupled to the second first-face coupling portion 93B1 illustrated in FIG. 10, so that the two coupling portions 92B1 and 93B1 communicate with each other. The third coupling flow path 191A2 has one end coupled to the third second-face coupling portion 92A2 illustrated in FIG. 5 and the other end coupled to the third first-face coupling portion 93A2 illustrated in FIG. 10, so that the two coupling portions 92A2 and 93A2 communicate with each other. The fourth coupling flow path 191B2 has one end coupled to the fourth second-face coupling portion 92B2 illustrated in FIG. 5 and the other end coupled to the fourth first-face coupling portion 93B2 illustrated in FIG. 10, so that the two coupling portions 92B2 and 93B2 communicate with each other. The fifth coupling flow path 191C1 has one end coupled to the fifth second-face coupling portion 92C1 illustrated in FIG. 5 and the other end coupled to the fifth first-face coupling portion 93C1 illustrated in FIG. 10, so that the two coupling portions 92C1 and 93C1 communicate with each other. The sixth coupling flow path 191D1 has one end coupled to the sixth second-face coupling portion 92D1 illustrated in FIG. 5 and the other end coupled to the sixth first-face coupling portion 93D1 illustrated in FIG. 10, so that the two coupling portions 92D1 and 93D1 communicate with each other. The seventh coupling flow path 191C2 has one end coupled to the seventh second-face coupling portion 92C2 illustrated in FIG. 5 and the other end coupled to the seventh first-face coupling portion 93C2 illustrated in FIG. 10, so that the two coupling portions 92C2 and 93C2 communicate with each other. The eighth coupling flow path 191D2 has one end coupled to the eighth second-face coupling portion 92D2 illustrated in FIG. 5 and the other end coupled to the eighth first-face coupling portion 93D2 illustrated in FIG. 10, so that the two coupling portions 92D2 and 93D2 communicate with each other.

The coupling flow paths 191A1 to 191D2 have respective first to eighth through-hole portions 98A1 to 98D2 extending through the flow-path substrate 69 in the X2 direction illustrated in FIG. 11, respective first to eighth flow-path portions 95A1 to 95D2 formed in the first side surface fb1 illustrated in FIG. 10, and respective first to eighth extension portions 94A1 to 94D2 formed in the second side surface fb2 illustrated in FIG. 11. When the first to eighth through-hole portions 98A1 to 98D2 are referred to without being distinguished one from the others, each of them is called the through-hole portion 98. When the first to eighth flow-path portions 95A1 to 95D2 are referred to without being distinguished one from the others, each of them is called the flow-path portion 95. When the first to eighth extension portions 94A1 to 94D2 are referred to without being distinguished one from the others, each of them is called the extension portion 94.

The flow-path portion 95 illustrated in FIG. 10 is defined by a groove formed in the first side surface fb1 and the first sealing substrate 86 covering the first side surface fb1, illustrated in FIG. 9. The flow-path portion 95 extends from the first-face coupling portion 93 in the Z1 direction opposite to the Z2 direction to the through-hole portion 98.

The extension portion 94 illustrated in FIG. 11 is defined by a groove formed in the second side surface fb2 and the second sealing substrate 85 covering the second side surface fb2, illustrated in FIG. 9. The extension portion 94 extends from the through-hole portion 98 toward the second-face coupling portion 92 in the Y2 direction. The statement "extend in the Y2 direction" includes not only the case of extending linearly in the Y2 direction but also the case in which the extension direction is inclined or curved relative to the Y2 direction as long as it extends toward the Y2 direction. The first extension portion 94A1 extends linearly in the Y2 direction from the first through-hole portion 98A1 toward the first second-face coupling portion 92A1. The second extension portion 94B1 extends linearly in the Y2 direction from the second through-hole portion 98B1 toward the first second-face coupling portion 92A1. The third to eighth extension portions 94A2 to 94D2 are flow paths part of which are inclined or curved relative to the Y2 direction. Since the flow-path substrate 69 has the through-hole portions 98 and the flow-path portions 95 and extension portions 94 respectively formed in the first and second side surfaces fb1 and fb2 and extending in different directions as described above, it is possible to downsize the flow-path substrate 69 and to form the coupling flow paths 191 extending three-dimensionally. This configuration prevents an increase in the size of the flow-path coupling member 60. Note that each of the first to eighth extension portions 94A1 to 94D2 illustrated in FIG. 11 has a straight flow-path portion 140 extending linearly in the Y2 direction at a portion closer to the second outer surface fa2 on the Y2 direction side of the flow-path coupling member 60. The straight flow-path portions 140 of the first to eighth extension portions 94A1 to 94D2 are located side by side in the Z2 direction.

In addition, as illustrated in FIG. 5, the second-face coupling portions 92 formed closer to the third outer surface fa3 than to the fourth outer surface fa4 in the X2 direction (specifically, the first, third, fifth, and seventh second-face coupling portions 92A1, 92A2, 92C1, and 92C2) further have the following flow-path portions. Specifically, each of the coupling flow paths 191A1, 191A2, 191C1, and 191C2 has an intermediate flow-path portion to connect the extension portion 94 formed in the second side surface fb2 and the second-face coupling portion 92A1, 92A2, 92C1, or 92C2 formed away from the second side surface fb2 in the X2 direction. As illustrated in FIG. 11, the intermediate flow-path portion includes a transit portion 96 having one end coupled to the second-face coupling portion 92A1, 92A2, 92C1, or 92C2 and a detour portion 99 extending in the X2 direction from the other end of the transit portion 96. The detour portion 99 is coupled to the extension portion 94. The transit portion 96 and the detour portion 99 will be described later in detail. Note that when the transit portions 96 and the detour portions 99 associated with the second-face coupling portions 92A1, 92A2, 92C1, and 92C2 are distinguished one from the others, the last two characters of the second-face coupling portions 92A1, 92A2, 92C1, and 92C2, specifically, A1, A2, C1, and C2, are affixed to the ends of the words.

The transit portions 96A1, A2, C1, and C2 and the detour portions 99A1, A2, C1, and C2 are provided in the middle of the flow paths for providing and collecting the same kind of liquid, in the present embodiment, cyan ink and yellow ink, to and from the liquid ejecting heads 10. Since the transit portions 96A1, A2, C1, and C2 and the detour portions 99A1, A2, C1, and C2 are provided for the same kind of liquid, it is possible to reduce variation in the flow-path resistance of the flow paths through which the same kind of liquid flows.

The coupling flow paths 191A1 to 191D2 illustrated in FIG. 10 have substantially equal lengths to reduce variation in the flow-path resistance. For example, the length L1 in the Z2 direction of the first flow-path portion 95A1 is longer than the length L2 of the second flow-path portion 95B1. In contrast, as illustrated in FIG. 11, the length T1 in the Y2 direction of the first extension portion 94A1 is shorter than the length T2 in the Y2 direction of the second extension portion 94B1. Since the lengths of the flow-path portions 95 and the extension portions 94 of the coupling flow paths 191A1 to 191D2 have the relationship as described above, the coupling flow paths 191 can be formed in the flow-path substrate 69 without using the area Rsp that is on the side opposite to the first outer surface fa1 and on the side opposite to the second outer surface fa2 illustrated in FIG. 10. With this configuration, the flow-path substrate 69 can be smaller by the size of the area Rsp, and in turn, the flow-path coupling member 60 can also be downsized.

As illustrated in FIG. 10, the flow-path substrate 69 has the recessed portion 141 where the first fixing member 88 illustrated in FIG. 9 is located. The recessed portion 141 is formed in the first side surface fb1. The recessed portion 141 extends in the Z2 direction from the surface of the flow-path substrate 69 opposite to the first outer surface fa1. The first insertion opening 78, illustrated in FIG. 8, into which the first fixing member 88 is inserted is formed at the end portion of the recessed portion 141 in the Z2 direction.

Figure 12:
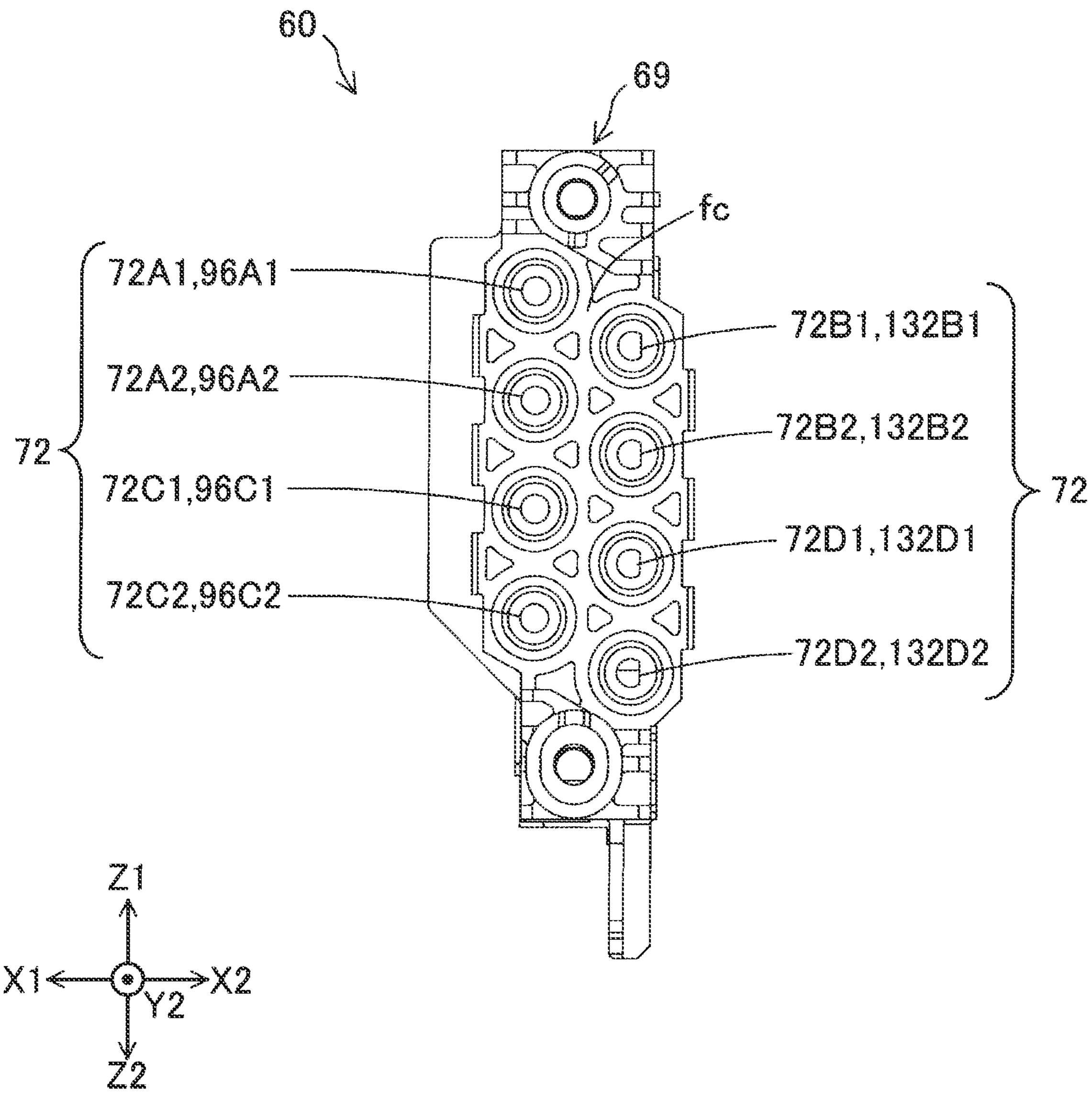
FIG. 12 is a diagram of the flow-path substrate viewed in the direction of a flow-path forming surface.
Figure 13:
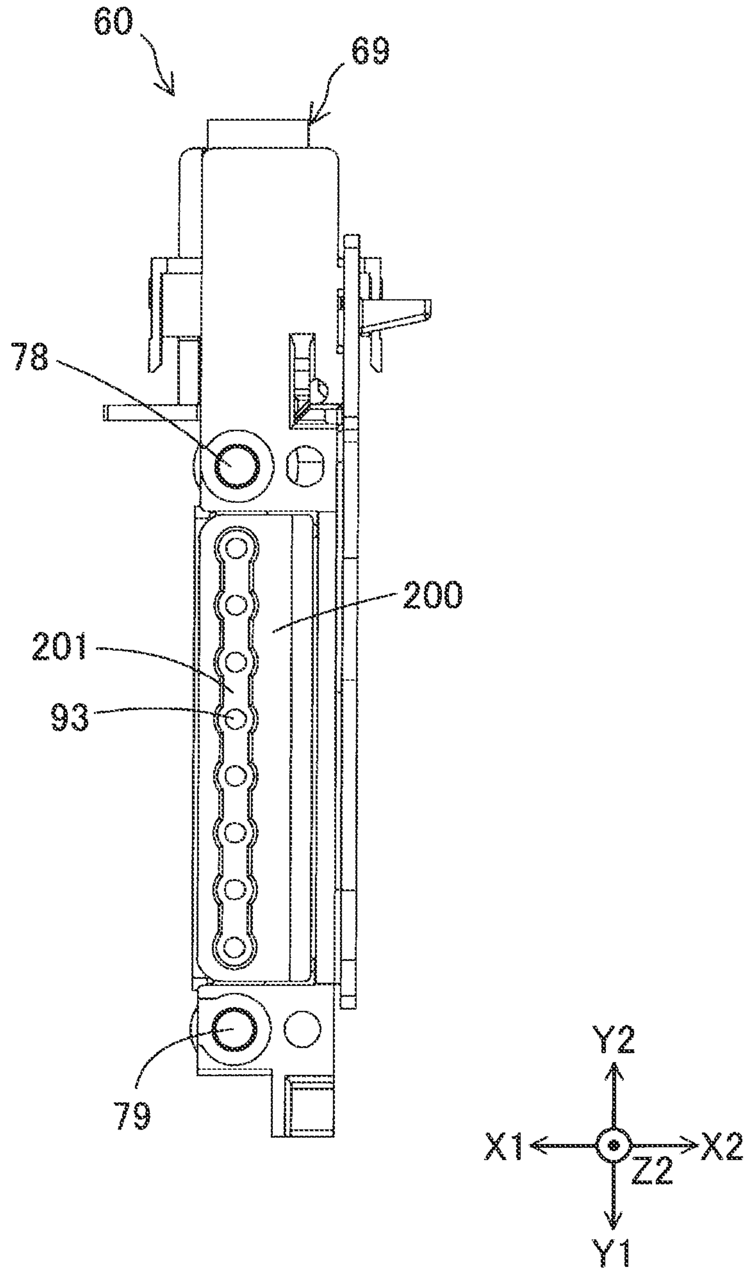
FIG. 13 is a diagram of the flow-path coupling member with a first-face bushing attached, viewed in the direction of the first outer surface.
Figure 14:
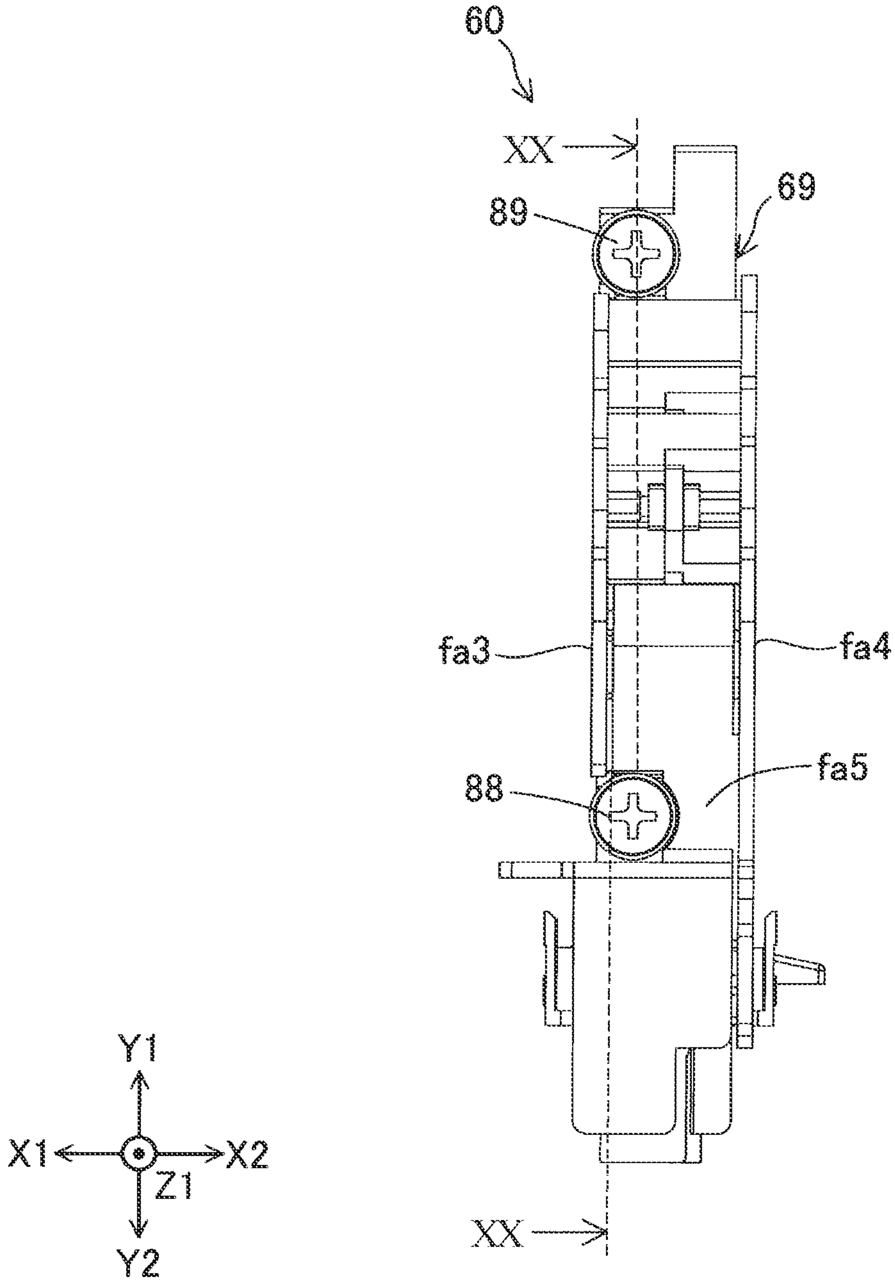
FIG. 14 is a diagram of the flow-path coupling member viewed in the direction of a fifth outer surface.
Figure 15:
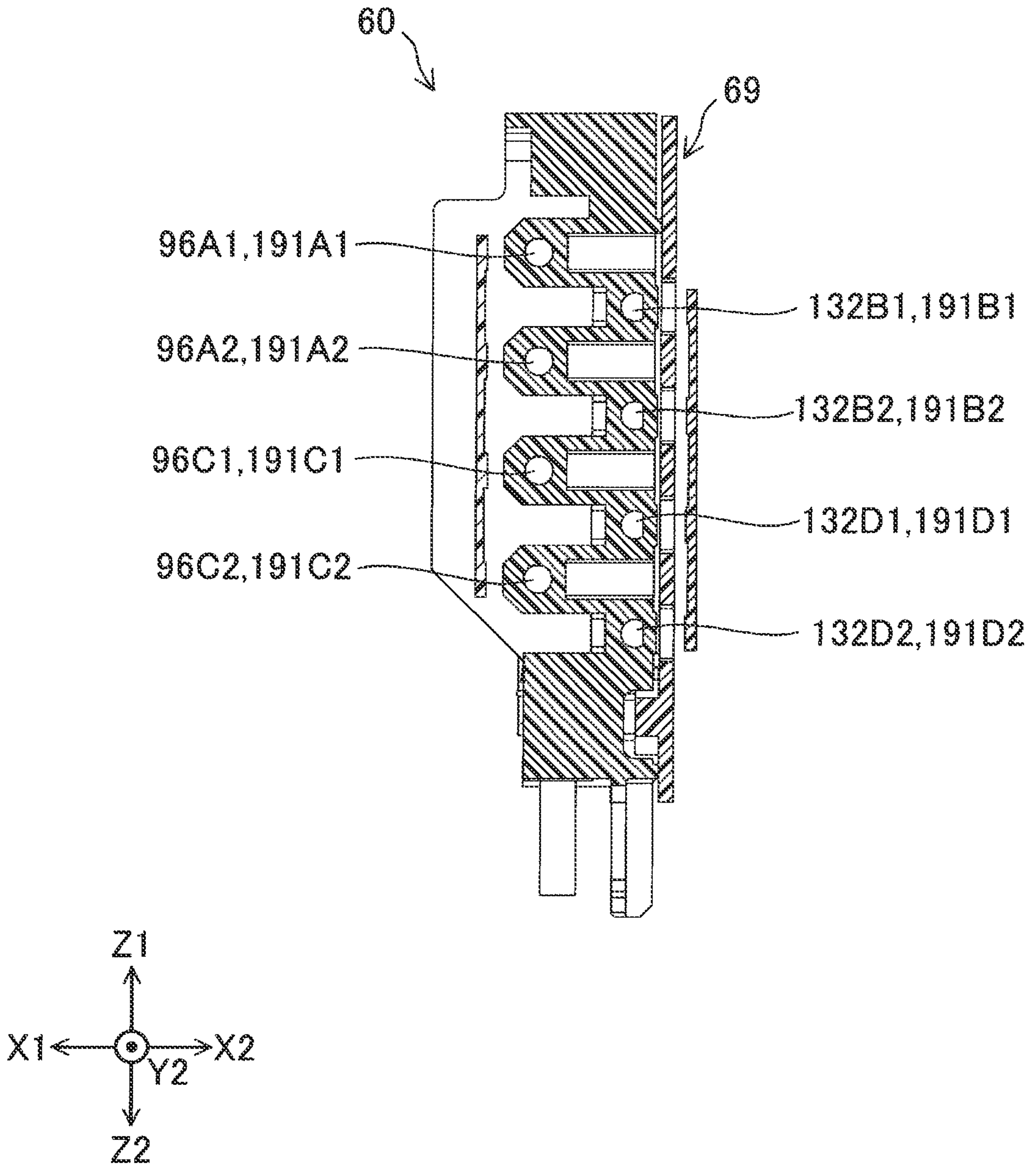
FIG. 15 is a cross-sectional view taken along line XV-XV in FIG. 4.
Figure 16:
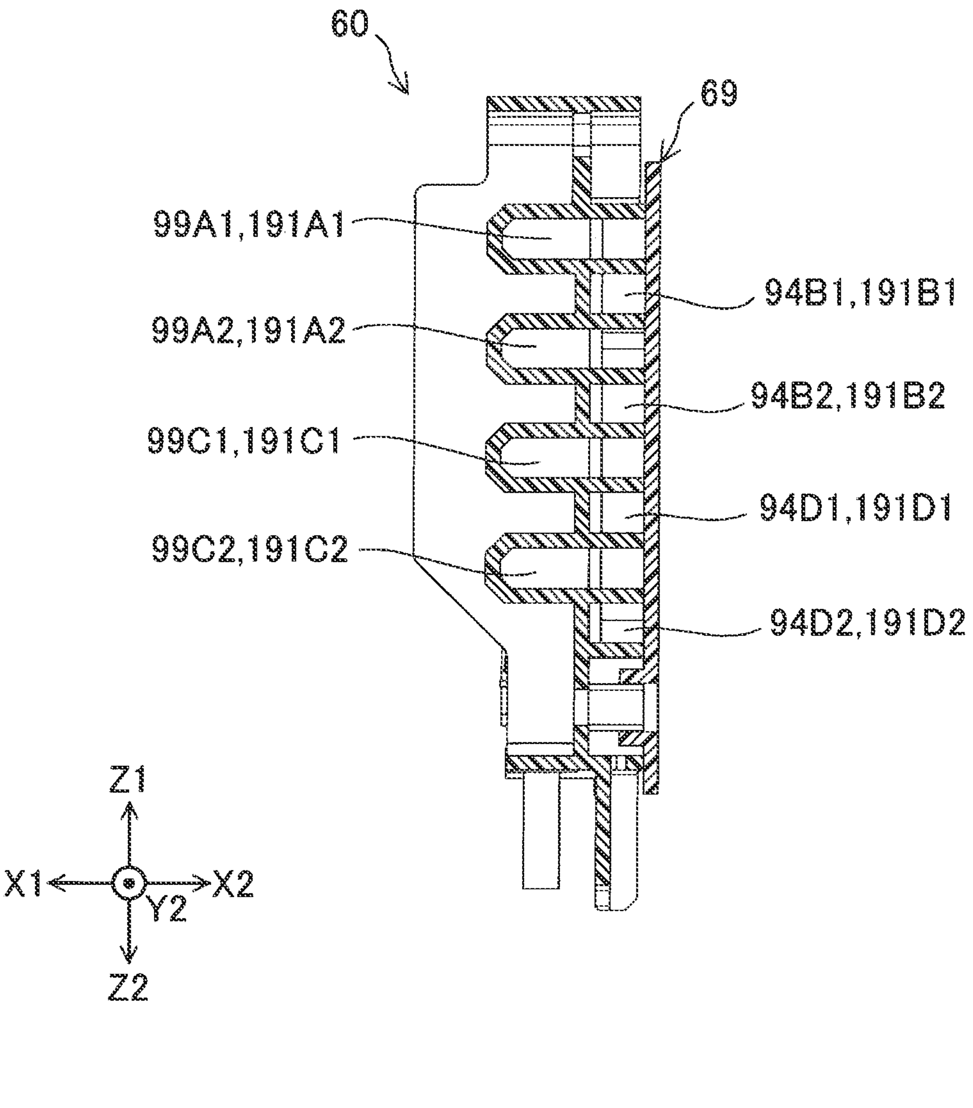
FIG. 16 is a cross-sectional view taken along line XVI-XVI in FIG. 4.
Figure 17:
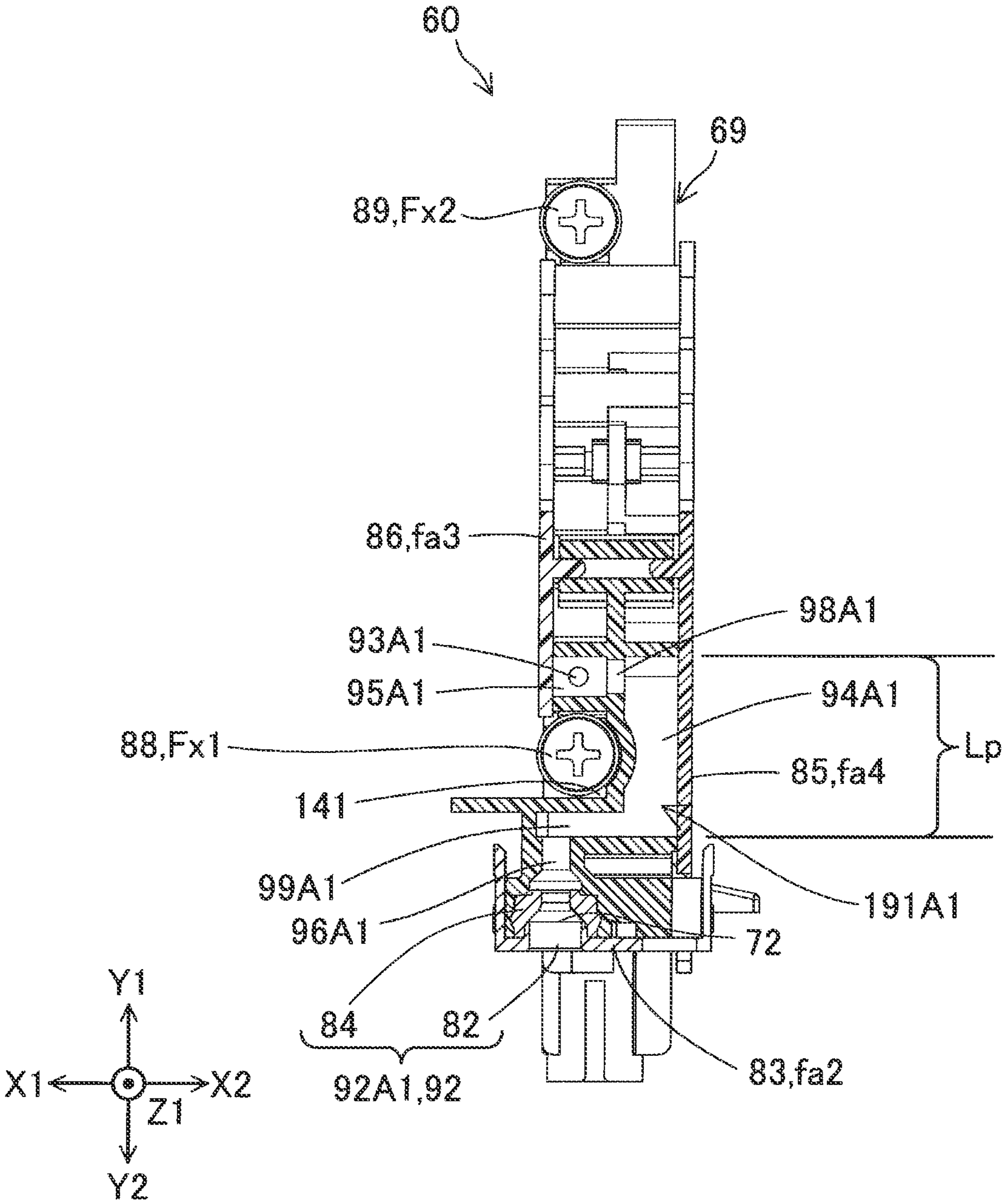
FIG. 17 is a cross-sectional view taken along line XVII-XVII in FIG. 5.
Figure 18:
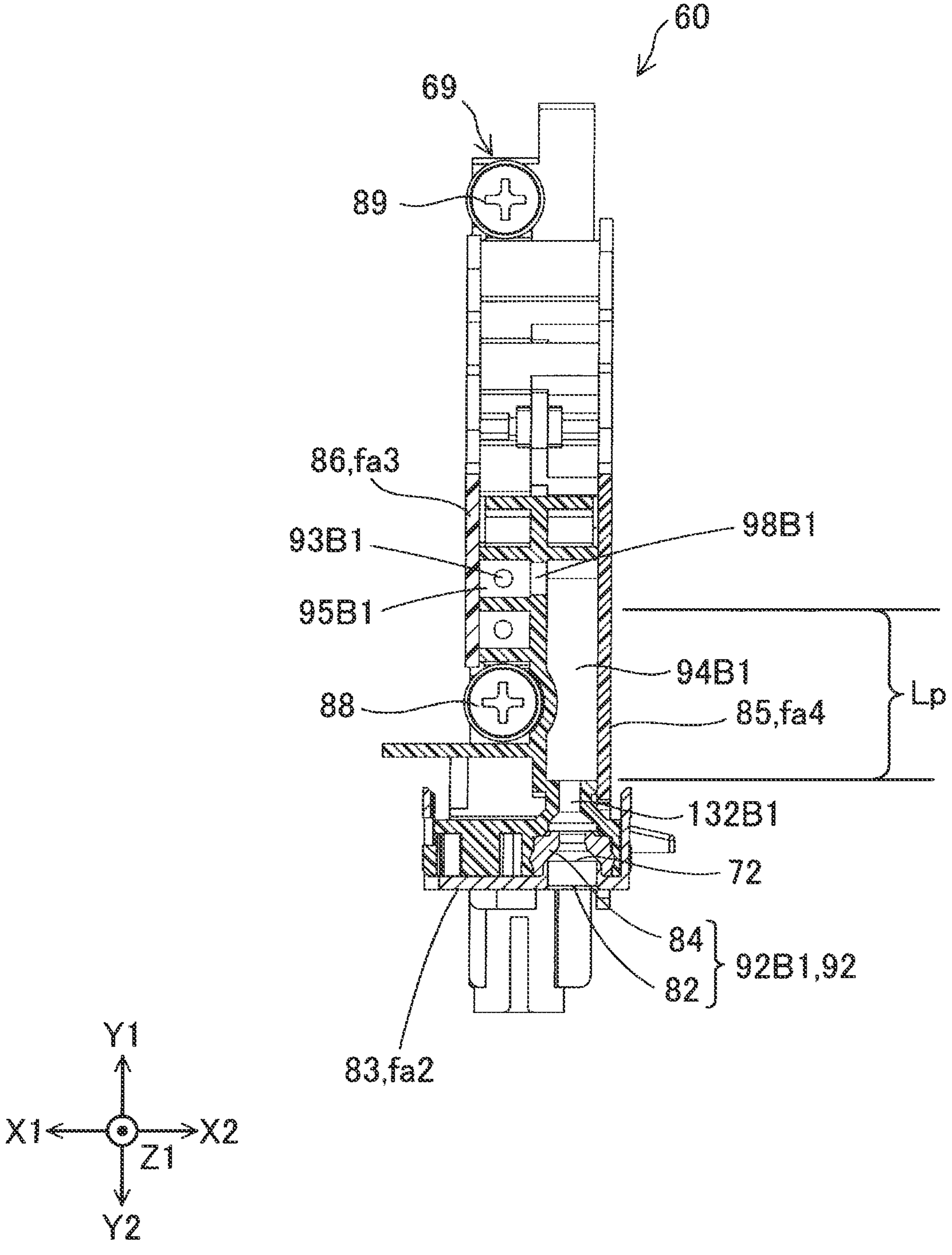
FIG. 18 is a cross-sectional view taken along line XVIII-XVIII in FIG. 5.
Figure 19:
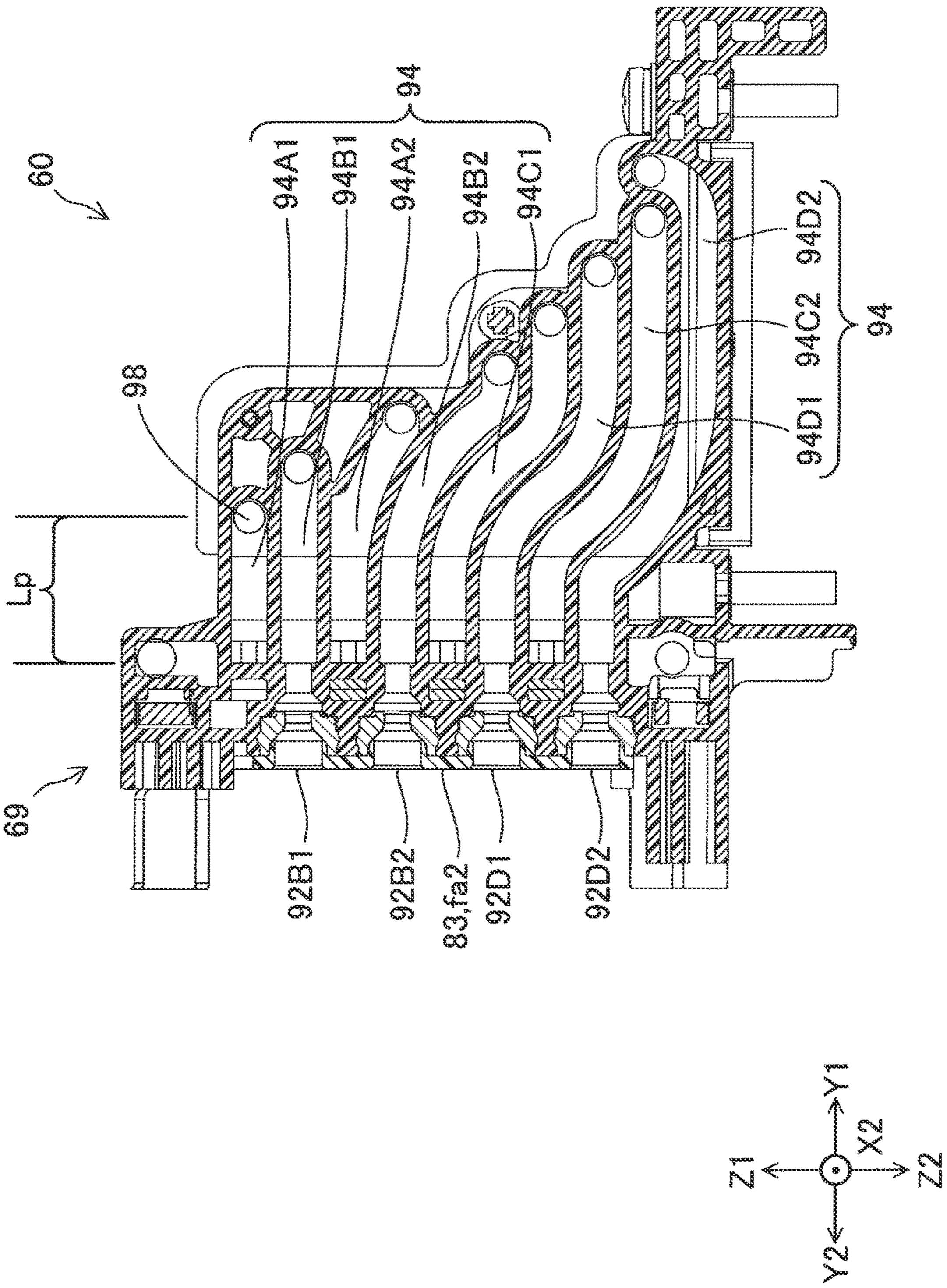
FIG. 19 is a cross-sectional view taken along line XIX-XIX in FIG. 5.
Figure 20:
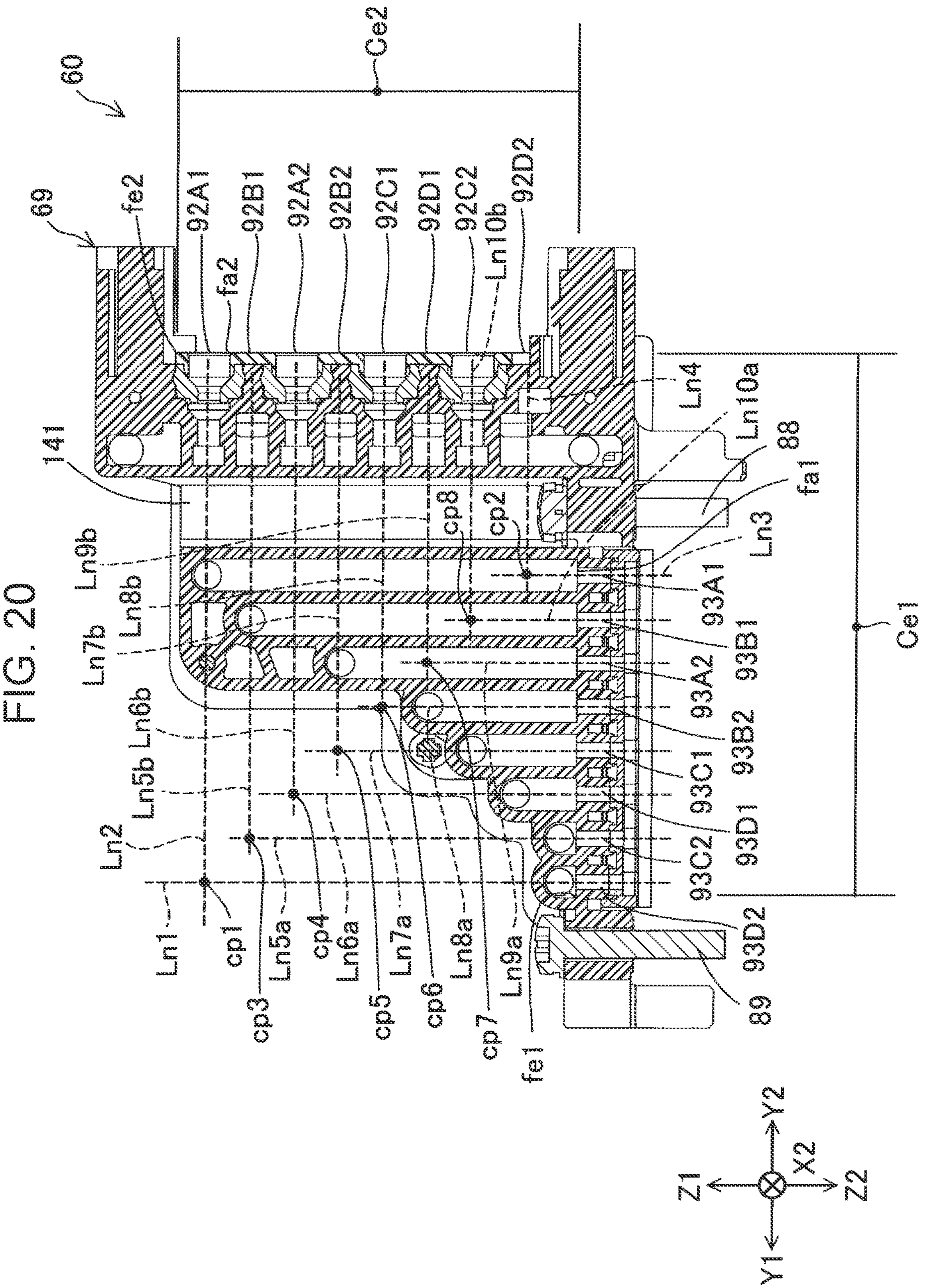
FIG. 20 is a cross-sectional view taken along line XX-XX in FIG. 14.

FIG. 12 is a diagram of the flow-path substrate 69 viewed in the direction of the flow-path forming surface fc. FIG. 13 is diagram of the flow-path coupling member 60 with the first-face bushing 200 attached, viewed in the direction of the first outer surface fa1. FIG. 14 is a diagram of the flow-path coupling member 60 viewed in the direction of the fifth outer surface fa5. FIG. 15 is a cross-sectional view taken along line XV-XV in FIG. 4. FIG. 16 is a cross-sectional view taken along line XVI-XVI in FIG. 4. FIG. 17 is a cross-sectional view taken along line XVII-XVII in FIG. 5. FIG. 18 is a cross-sectional view taken along line XVIII-XVIII in FIG. 5. FIG. 19 is a cross-sectional view taken along line XIX-XIX in FIG. 5. FIG. 20 is a cross-sectional view taken along line XX-XX in FIG. 14. Details of the coupling flow paths 191 will be mainly described with reference to FIGS. 12 to 20.

As illustrated in FIG. 12, the flow-path forming surface fc has the plurality of openings 72 at the positions the same as those of the second-face coupling portions 92A1 to 92D2 as viewed in the Y1 direction. Each of the openings 72 extends linearly in the Y1 direction, which is opposite to the Y2 direction, from the flow-path forming surface fc and serves as one end of a communicating portion which is the flow path extending through the flow-path substrate 69. The communicating portions including, at one end, the respective first, third, fifth, and seventh openings 72A1, 72A2, 72C1, and 72C2 serve as the foregoing transit portions 96A1, 96A2, 96C1, and 96C2 illustrated in FIG. 11. The communicating portions 132B1, 132B2, 132D1, and 132D2 including, at one end, the respective second, fourth, sixth, and eighth openings 72B1, 72B2, 72D1, and 72D2 couple the second-face coupling portions 92B1, 92B2, 92D1, and 92D2 and the extension portions 94B1, 94B2, 94D1, and 94D2. Note that a configuration in which the flow-path coupling member 60 does not have a cover member 83 and second-face bushings 84 illustrated in FIG. 9 is possible. In that case, the openings 72 function as the second-face coupling portions.

Next, details of the coupling flow paths 191 connecting the first-face coupling portions 93 and the second-face coupling portions 92 will be described. Of the coupling flow paths 191, the first, third, fifth, and seventh coupling flow paths 191A1, 191A2, 191C1, and 191C2 have the same flow-path configuration, and hence, the first coupling flow path 191A1 is used to describe the flow-path configuration. Of the coupling flow paths 191, the second, fourth, sixth, and eighth coupling flow paths 191B1, 191B2, 191D1, and 191D2 have the same flow-path configuration, and hence, the second coupling flow path 191B1 is used to describe the flow-path configuration.

As illustrated in FIG. 17, the first coupling flow path 191A1 has, on the path from the first second-face coupling portion 92A1 to the first first-face coupling portion 93A1, the first transit portion 96A1, the first detour portion 99A1, the first extension portion 94A1, the first through-hole portion 98A1, and the first flow-path portion 95A1 in this order. The first transit portion 96A1 is a flow path extending from the first second-face coupling portion 92A1 linearly in the direction opposite to the Y2 direction. One end of the first transit portion 96A1 is coupled to the first second-face coupling portion 92A1. The other end of the first transit portion 96A1 is coupled to the first detour portion 99A1. The first detour portion 99A1 is located between the first transit portion 96A1 and the first extension portion 94A1 and connects the first transit portion 96A1 and the first extension portion 94A1. Part of the walls defining the first detour portion 99A1 includes part of the walls of the recessed portion 141. As illustrated in FIGS. 15 and 16, as with the first coupling flow path 191A1, the third coupling flow path 191A2 has the third transit portion 96A2 and the third detour portion 99A2. As with the first coupling flow path 191A1, the fifth coupling flow path 191C1 has the fifth transit portion 96C1 and the fifth detour portion 99C1. As with the first coupling flow path 191A1, the seventh coupling flow path 191C2 has the seventh transit portion 96C2 and the seventh detour portion 99C2.

As illustrated in FIG. 18, the second coupling flow path 191B1 has, on the path from the second second-face coupling portion 92B1 to the second first-face coupling portion 93B1, the second communicating portion 132B1, the second extension portion 94B1, the second through-hole portion 98B1, and the second flow-path portion 95B1 in this order. The second communicating portion 132B1 is a flow path extending linearly from the second second-face coupling portion 92B1 in the direction opposite to the Y2 direction. One end of the second communicating portion 132B1 is coupled to the second first-face coupling portion 93B1. The other end of the second communicating portion 132B1 is coupled to the second extension portion 94B1. The second extension portion 94B1 connects the second through-hole portion 98B1 and the second second-face coupling portion 92B1 via the second communicating portion 132B1. As illustrated in FIG. 15, as with the second coupling flow path 191B1, the fourth coupling flow path 191B2 has the fourth communicating portion 132B2. As with the second coupling flow path 191B1, the sixth coupling flow path 191D1 has the sixth communicating portion 132D1. As with second coupling flow path 191B1, the eighth coupling flow path 191D2 has the eighth communicating portion 132D2.

As illustrated in FIG. 19, the plurality of extension portions 94A1 to 94D2 including the first extension portion 94A1 and the second extension portion 94B1 have overlapped portions Lp where the plurality of extension portions 94A1 to 94D2 overlap one another as viewed in the Z2 direction. As illustrated in FIG. 17, the first fixation position Fx1 adjoins both the overlapped portions Lp and the flow-path portions 95 as the flow-path coupling member 60 is viewed in the Z2 direction. Specifically, as the flow-path coupling member 60 is viewed in the Z2 direction, the first fixation position Fx1 adjoins the overlapped portions Lp in the X2 direction. In addition, as the flow-path coupling member 60 is viewed in the Z2 direction, the first fixation position Fx1 adjoins the flow-path portions 95 in the Y2 direction. Since the flow-path coupling member 60 has the overlapped portions Lp, the area that the plurality of extension portions 94 occupy can be small in the directions in the plane orthogonal to the Z2 direction. Since the area that the plurality of extension portions 94 occupy is small, the saved space can be utilized effectively to locate the first fixation position Fx1. Since the first fixation position Fx1 adjoins the flow-path portions 95, the force to fix the flow-path coupling member 60 to the common flow-path member 30 at the first fixation position Fx1 can be firmly acted on the common flow-path member 30 and the first-face coupling portions 93. This configuration reduces the possibility of liquid leaking between the common flow-path member 30 and the first-face coupling portions 93.

The first fixation position Fx1 adjoins the overlapped portions Lp and is located between the first flow-path portion 95A1 and the first detour portion 99A1 as the flow-path coupling member 60 is viewed in the Z2 direction. Since this configuration makes it possible to utilize the saved space effectively to locate the first fixation position Fx1, it is possible to downsize the flow-path coupling member 60. As illustrated in FIG. 11, although the length T2 of the second extension portion 94B1 is longer than the length T1 of the first extension portion 94A1, provision of the first detour portion 99A1 reduces variation in the flow path length between the first coupling flow path 191A1 and the second coupling flow path 191B1.

As illustrated in FIG. 20, as the flow-path coupling member 60 is viewed in the X2 direction, the straight line extending in the Z2 direction so as to pass through the center of the eighth first-face coupling portion 93D2 farthest from the second outer surface fa2 in the Y2 direction out of the plurality of first-face coupling portions 93 is referred to as the first straight line Ln1. As the flow-path coupling member 60 is viewed in the X2 direction, the straight line extending in the Y2 direction so as to pass through the center of the first second-face coupling portion 92A1 farthest from the first outer surface fa1 in the Z2 direction out of the plurality of second-face coupling portions 92 is referred to as the second straight line Ln2. As the flow-path coupling member 60 is viewed in the X2 direction, the straight line extending in the Z2 direction so as to pass through the center of the first first-face coupling portion 93A1 closest to the second outer surface fa2 in the Y2 direction out of the plurality of first-face coupling portions 93 is referred to as the third straight line Ln3. As the flow-path coupling member 60 is viewed in the X2 direction, the straight line extending in the Y2 direction so as to pass through the center of the eighth second-face coupling portion 92D2 closest to the first outer surface fa1 in the Z2 direction out of the plurality of second-face coupling portions 92 is referred to as the fourth straight line Ln4.

In the above case, as viewed in the X2 direction, the flow-path coupling member 60 does not overlap the intersection point cp1 of the first straight line Ln1 and the second straight line Ln2 and overlaps the intersection point cp2 of the third straight line Ln3 and the fourth straight line Ln4. Since the flow-path coupling member 60 has a shape that does not overlap the one intersection point cp1, the flow-path coupling member 60 can be smaller than when the flow-path coupling member 60 has a shape that overlaps the intersection points cp1 and cp2.

In particular, in the present embodiment, the flow-path coupling member 60 and the intersection points have the following positional relationship. Here, both the number of the first-face coupling portions 93A1 to 93D2 and the number of the second-face coupling portions 92A1 to 92D2 are defined as M. M is an integer of two or more, in the present embodiment, eight. The straight line extending in the Z2 direction so as to pass through the center of the first-face coupling portion 93 located N-th farthest (N is an integer from one to M) from the second outer surface fa2 in the Y2 direction out of the plurality of first-face coupling portions 93A1 to 93D2 is referred to as a Z-axis-direction straight line. The Z-axis-direction straight line is an example of a first-direction straight line. The Z-axis-direction straight lines include the first straight line Ln1 and the third straight line Ln3 described above, with the additions of a fifth straight line Ln5*a*, a seventh straight line Ln6*a*, a ninth straight line Ln7*a*, an eleventh straight line Ln8*a*, a thirteenth straight line Ln9*a*, and a fifteenth straight line Ln10*a*.

The straight line extending in the Y2 direction so as to pass through the center of the second-face coupling portion 92 located N-th farthest in the Z2 direction out of the plurality of second-face coupling portions 92A1 to 92D2 is referred to as a Y-axis-direction straight line. The Y-axis-direction straight line is an example of a second-direction straight line. The Y-axis-direction straight lines include, in addition to the second straight line Ln2 and the fourth straight line Ln4 described above, a sixth straight line Ln5*b*, an eighth straight line Ln6*b*, a tenth straight line Ln7*b*, a twelfth straight line Ln8*b*, a fourteenth straight line Ln9*b*, and a sixteenth straight line Ln10*b*.

When the point at which the N-th X-axis-direction straight line intersects the N-th Y-axis-direction straight line is referred to as the intersection point cp, the number of intersection points cp is M. In the present embodiment, the number of intersection points cp is eight. The intersection points cp include, in addition to the fore going intersection points cp1 and cp2, the intersection points cp3 to cp8. The intersection point cp3 is of the fifth straight line Ln5*a* and the sixth straight line Ln5*b*. The intersection point cp4 is of the seventh straight line Ln6*a* and the eighth straight line Ln6*b*. The intersection point cp5 is of the ninth straight line Ln7*a* and the tenth straight line Ln7*b*. The intersection point cp6 is of the eleventh straight line Ln8*a* and the twelfth straight line Ln8*b*. The intersection point cp7 is of the thirteenth straight line Ln9*a* and the fourteenth straight line Ln9*b*. The intersection point cp8 is of the fifteenth straight line Ln10*a* and the sixteenth straight line Ln10*b*.

In the above case, as viewed in the X2 direction, the flow-path coupling member 60 does not overlap the intersection points cp1, cp3, cp4, cp5, and cp6, the number of which is larger than or equal to half of the number of intersection points, 8, and overlaps the other intersection points cp2, cp7, and cp8, the number of which is one or more. Since the flow-path coupling member 60 in this configuration has a shape that does not overlap the intersection points cp1, cp3, cp4, cp5, and cp6, the number of which is larger than or equal to half of the number of intersection points, the flow-path coupling member 60 can be smaller than when the flow-path coupling member 60 has a shape that overlaps half or more of the intersection points.

In other words, since the area Rsp opposite to the first outer surface fa1 and opposite to the second outer surface fa2 does not have to be used to form the flow-path coupling member 60, the flow-path coupling member 60 can be small.

As illustrated in FIG. 20, in the Y2 direction, the space between the second outer surface fa2 and the center position Ce1 of the second outer surface fa2 and the end portion fe1 of the first outer surface fa1 which is farthest from the second outer surface fa2 includes the first and second first-face coupling portions 93A1 and 93B1, which are part of the plurality of first-face coupling portions 93A1 to 93D2. In addition, in the Z2 direction, the space between the first outer surface fa1 and the center position Ce2 of the first outer surface fa1 and the end portion fe2 of the second outer surface fa2 farthest from the first outer surface fa1 includes the fifth to eighth second-face coupling portions 92C1 to 92D2, which are part of the plurality of second-face coupling portions 92A1 to 92D2. The space between the center position Ce1 and the second outer surface fa2 in the Y2 direction and the space between the center position Ce2 and the first outer surface fa1 in the Z2 direction are utilized effectively to form part of the plurality of first-face coupling portions 93A1 to 93D2 and part of the plurality of second-face coupling portions 92A1 to 92D2. This configuration makes it possible to downsize the flow-path coupling member 60.

In the above embodiment, as illustrated in FIG. 8, the plurality of first-face coupling portions 93A1 to 93D2 are provided in the first outer surface fa1 and arranged in the Y2 direction, and as illustrated in FIG. 5, the plurality of second-face coupling portions 92A1 to 92D2 are provided in the second outer surface fa2 intersecting the first outer surface fa1 and are arranged in the Z2 direction. With this configuration, the directions of the coupling flow paths 191 formed in the flow-path coupling member 60 are changed in the middle, and it is possible to couple the common flow-path member 30 and the supply and collection flow paths 56 and 57 by using the flow-path coupling member 60. With this configuration, the flow-path coupling member 60 in the directions orthogonal to the Z2 direction and the Y2 direction can be small.

B. OTHER EMBODIMENTS

B-1. Another Embodiment 1

Although the flow-path coupling member 60 enables fluid to flow between the common flow-path member 30 and the supply and collection flow paths 56 and 57 in the above embodiment, the present disclosure is not limited to the above embodiment but may be applied to any member through which fluid can flow between a first flow-path member and a second flow-path member each of which has flow paths.

B-2. Another Embodiment 2

Although the external flow-path member 151, which is an example of the second flow-path member, in the above embodiment includes the flow-path forming case 150, the plurality of flow-path pipes FP protruding from the flow-path forming case 150, and the plurality of supply and collection flow paths 56 and 57 coupled to the flow-path forming case 150, the present disclosure is not limited to this configuration. A configuration in which the external flow-path member does not include a flow-path forming case 150, and in which the flow-path pipes provided at the distal ends of the plurality of supply flow paths and the flow-path pipes provided at the distal ends of the plurality of collection flow paths are coupled to the second-face coupling portions 92 of the flow-path coupling member 60 is possible.

B-3. Another Embodiment 3

Although in the above embodiment, the first-face coupling portions 93 are flow-path pipes, in other words, flow-path joints in protruding shapes, and the second-face coupling portions 92 are flow-path joints in recessed shapes into which the flow-path pipes are inserted, the present disclosure is not limited to this configuration. The first-face coupling portions 93 may be flow-path joints in recessed shapes into which flow-path pipes or flow-path needles of a first flow-path member are inserted, and the second-face coupling portions 92 may be flow-path pipes, flow-path needles, or the like that are inserted into recessed flow-path joints of a second flow-path member.

C. Other Configurations

The present disclosure is not limited to the foregoing embodiments and can be implemented in various aspects within the scope not departing from the spirit. For example, the present disclosure may be implemented in the following aspects. The technical features in the foregoing embodiments corresponding to the technical features of the aspects written below can be replaced or combined as appropriate to solve some or all of the issues of the present disclosure or to achieve some of all of the effects of the present disclosure. Unless technical features are explained as essential ones in the present specification, they can be omitted as appropriate.

(1) A first aspect of the present disclosure provides a flow-path coupling member. The flow-path coupling member includes: a plurality of first-face coupling portions each configured to be coupled to a corresponding one of flow paths of a first flow-path member; a plurality of second-face coupling portions each configured to be coupled to a corresponding one of flow paths of a second flow-path member; a plurality of coupling flow paths each connecting a corresponding one of the first-face coupling portions and a corresponding one of the second-face coupling portions; a first outer surface facing a first direction; and a second outer surface facing a second direction intersecting the first direction, the plurality of first-face coupling portions are provided in the first outer surface and arranged in the second direction, and the plurality of second-face coupling portions are provided in the second outer surface and arranged in the first direction. With this configuration, it is possible to change the direction of the flow paths formed in the flow-path coupling member in the middle to couple the first flow-path member and the second flow-path member by using the flow-path coupling member. The first outer surface has the plurality of first-face coupling portions arranged in the second direction, and the second outer surface intersecting the first outer surface has the plurality of second-face coupling portions arranged in the first direction. This reduces the size of the flow-path coupling member in the direction orthogonal to the first direction and the second direction.

(2) In the above aspect, the flow-path coupling member may further include a flow-path substrate having a first side surface and a second side surface opposed to each other in a third direction orthogonal to both the first direction and the second direction, and each of the coupling flow paths may include a through-hole portion extending through the flow-path substrate in the third direction, a flow-path portion formed in the first side surface and extending from a corresponding one of the first-face coupling portions to the through-hole portion in a direction opposite to the first direction, and an extension portion formed in the second side surface and extending from the through-hole portion toward a corresponding one of the second-face coupling portions in the second direction. Since this configuration includes the through-hole portions and the flow-path portions and extension portions formed in the first and second side surfaces of the flow-path substrate and extending in different directions, it is possible to form the coupling flow paths extending three-dimensionally while downsizing the flow-path substrate. This prevents an increase in the size of the flow-path coupling member.

(3) In the above aspect, the plurality of extension portions may have overlapped portions overlapping one another as viewed in the first direction, and a first fixation position at which the flow-path coupling member is fixed to the first flow-path member may adjoin both the overlapped portions and the flow-path portions as viewed in the first direction. Since this configuration has the overlapped portions, the area that the plurality of extension portions occupy can be small in the directions in the plane orthogonal to the first direction. Since the area that the plurality of extension portions occupy can be small, the saved space can be utilized effectively to form the first fixation position. Since the first fixation position adjoins the flow-path portions, the force to fix the flow-path coupling member to the first flow-path member at the first fixation position can be firmly acted on the first flow-path member and the first-face coupling portions. This configuration reduces the possibility of liquid leaking between the first flow-path member and the first-face coupling portions.

(4) In the above aspect, the plurality of first-face coupling portions may be located, in the second direction, between the first fixation position and a second fixation position that differs from the first fixation position and at which the flow-path coupling member is fixed to the first flow-path member. In this configuration, since the fixation force of the first fixing member and the second fixing member can be firmly acted on the coupling portions between the plurality of first-face coupling portions and the first flow-path member, it is possible to prevent liquid from leaking between the first-face coupling portions and the first flow-path member.

(5) In the above aspect, to fix the flow-path coupling member to the first flow-path member at the first fixation position, a first fixing member may be inserted into the flow-path coupling member and the first flow-path member in the first direction. With this configuration, it is possible to fix the flow-path coupling member to the first flow-path member easily by inserting the first fixing member in the first direction.

(6) In the above aspect, the plurality of second-face coupling portions may include a first second-face coupling portion and a second second-face coupling portion, the plurality of first-face coupling portions may include a first first-face coupling portion communicating with the first second-face coupling portion and a second first-face coupling portion communicating with the second second-face coupling portion, the first second-face coupling portion may be farther than the second second-face coupling portion from the first outer surface in the first direction, and the first first-face coupling portion may be closer than the second first-face coupling portion to the second outer surface in the second direction. With this configuration, it is possible to reduce variation in the length of the coupling flow paths connecting the second-face coupling portions and the respective first-face coupling portions associated with the second-face coupling portions.

(7) In the above aspect, the flow-path coupling member may further include a flow-path substrate having a first side surface and a second side surface opposed to each other in a third direction orthogonal to both the first direction and the second direction, the plurality of coupling flow paths may include a first coupling flow path connecting the first second-face coupling portion and the first first-face coupling portion and a second coupling flow path connecting the second second-face coupling portion and the second first-face coupling portion, the first coupling flow path may include a first through-hole portion extending through the flow-path substrate in the third direction, a first flow-path portion formed in the first side surface and extending from the first first-face coupling portion to the first through-hole portion in a direction opposite to the first direction, and a first extension portion formed in the second side surface and extending from the first through-hole portion toward the first second-face coupling portion in the second direction, the second coupling flow path may include a second through-hole portion extending through the flow-path substrate in the third direction, a second flow-path portion formed in the first side surface and extending from the second first-face coupling portion to the second through-hole portion in the direction opposite to the first direction, and a second extension portion formed in the second side surface and extending from the second through-hole portion toward the second second-face coupling portion in the second direction, a length of the first flow-path portion in the first direction may be longer than a length of the second flow-path portion in the first direction, and a length of the first extension portion in the second direction may be shorter than a length of the second extension portion in the second direction. With this configuration, it is possible to form the coupling flow paths in the flow-path substrate without using the area opposite to the first outer surface and opposite to the second outer surface. This makes it possible to downsize the flow-path substrate and in turns to downsize the flow-path coupling member.

(8) In the above aspect, the first coupling flow path may include a first transit portion extending from the first second-face coupling portion in a direction opposite to the second direction and a first detour portion extending from the first transit portion in the third direction and connecting the first transit portion and the first extension portion, the second extension portion may connect the second through-hole portion and the second second-face coupling portion, the first extension portion and the second extension portion may have overlapped portions that overlap each other as viewed in the first direction, and a first fixation position at which the flow-path coupling member is fixed to the first flow-path member may adjoin the overlapped portions as viewed in the first direction and be located between the first flow-path portion and the first detour portion. In this configuration, since the first fixation position adjoins the overlapped portions as viewed in the first direction and is located between the first flow-path portion and the first detour portion, it is possible to utilize the space effectively to locate the first fixation position. This configuration makes it possible to downsize the flow-path coupling member.

(9) In the above aspect, the first second-face coupling portion may partially overlap the second second-face coupling portion as viewed in the third direction. In this configuration, since the first second-face coupling portion partially overlaps the second second-face coupling portion as viewed in the third direction, part of the first second-face coupling portion and part of the second second-face coupling portion are located at the same position in the first direction. With this configuration, the second outer surface in the first direction can be small, and this prevents an increase in the first direction in the size of the flow-path coupling member.

(10) In the above aspect, a configuration is possible in which as viewed in the third direction, the flow-path coupling member does not overlap an intersection point of a straight line extending in the first direction so as to pass through a center of the first-face coupling portion located farthest from the second outer surface in the second direction out of the plurality of first-face coupling portions and a straight line extending in the second direction so as to pass through a center of the second-face coupling portion located farthest from the first outer surface in the first direction out of the plurality of second-face coupling portions, and the flow-path coupling member overlaps an intersection point of a straight line extending in the first direction so as to pass through a center of the first-face coupling portion located closest to the second outer surface in the second direction out of the plurality of first-face coupling portions and a straight line extending in the second direction so as to pass through a center of the second-face coupling portion located closest to the first outer surface in the first direction out of the plurality of second-face coupling portions. In this configuration, since the flow-path coupling member has a shape that does not overlap at least one of the intersection points, the flow-path coupling member can be smaller than when the flow-path coupling member has a shape that overlaps all of the intersection points.

(11) In the above aspect, a configuration is possible in which both the number of the first-face coupling portions and the number of the second-face coupling portions are M, M being an integer of two or more, and when a straight line extending in the first direction so as to pass through a center of the first-face coupling portion located N-th farthest from the second outer surface in the second direction out of the plurality of first-face coupling portions is referred to as a first-direction straight line, N being an integer from one to M, and a straight line extending in the second direction so as to pass through a center of the second-face coupling portion located N-th farthest in the first direction out of the plurality of second-face coupling portions is referred to as a second-direction straight line, the number of intersection points at which the N-th first-direction straight line and the N-th second-direction straight line intersect each other is M, and as viewed in the third direction, the flow-path coupling member does not overlap half or more of the M intersection points and overlaps the other one or more intersection points. In this configuration, since the flow-path coupling member has a shape that does not overlap half or more of the intersection points, the flow-path coupling member can be smaller than when the flow-path coupling member has a shape that overlaps half or more of the intersection points.

(12) In the above aspect, the plurality of first-face coupling portions may be arranged in a row in the second direction, the plurality of second-face coupling portions may be arranged in two rows in the first direction, the two rows may be located side by side in a third direction orthogonal to both the first direction and the second direction, and as viewed in the third direction, each of the second-face coupling portions included in one row of the two rows may partially overlap a certain one or certain ones of the second-face coupling portions included in the other row. In this configuration, the second outer surface in the first direction can be small, and this prevents an increase in the first direction in the size of the flow-path coupling member.

(13) In the above aspect, in the second direction, some of the plurality of first-face coupling portions may be located between the second outer surface and a center position of the second outer surface and an end portion of the first outer surface farthest from the second outer surface, and in the first direction, some of the plurality of second-face coupling portions may be located between the first outer surface and a center position of the first outer surface and an end portion of the second outer surface farthest from the first outer surface. In this configuration, the space between the center position and the second outer surface in the second direction and the space between the center position and the first outer surface in the first direction can be utilized effectively to form some of the plurality of first-face coupling portions and some of the plurality of second-face coupling portions. This makes it possible to downsize the flow-path coupling member.

(14) A second aspect of the present disclosure provides a head unit. The head unit includes: the flow-path coupling member according to the above aspect; a first flow-path member coupled to the plurality of first-face coupling portions of the flow-path coupling member; and a nozzle configured to eject liquid supplied from the first flow-path member. This configuration provides a head unit including a flow-path coupling member the size of which is reduced in the direction orthogonal to the first direction and the second direction.

(15) A third aspect of the present disclosure provides a liquid ejecting apparatus. The liquid ejecting apparatus includes: the head unit according to the above aspect; and a second flow-path member coupled to the plurality of second-face coupling portions of the flow-path coupling member. This configuration provides a liquid ejecting apparatus including a flow-path coupling member the size of which is reduced in the direction orthogonal to the first direction and the second direction.

The present disclosure can be implemented in various aspects other than the above ones. For example, the present disclosure can be implemented in aspects such as a method of manufacturing a flow-path coupling member, a head unit, or a liquid ejecting apparatus.

What is claimed is:

1. A flow-path coupling member comprising:

first-face coupling portions each configured to be coupled to a corresponding one of flow paths of a first flow-path member that is separate from the flow-path coupling member;

second-face coupling portions each configured to be coupled to a corresponding one of flow paths of a second flow-path member that is separate from the flow-path coupling member;

coupling flow paths each connecting a corresponding one of the first-face coupling portions and a corresponding one of the second-face coupling portions;

a first outer surface facing a first direction; and a second outer surface facing a second direction intersecting the first direction, wherein the first-face coupling portions are provided in the first outer surface and arranged in the second direction, and the second-face coupling portions are provided in the second outer surface and arranged in the first direction.

2. The flow-path coupling member according to claim 1, further comprising a flow-path substrate having a first side surface and a second side surface that is opposite from the first side surface, wherein each of the first side surface and the second side surface faces a third direction orthogonal to both the first direction and the second direction or a direction opposite to the third direction, each of the coupling flow paths includes a through-hole portion extending through the flow-path substrate in the third direction, a flow-path portion formed in the first side surface and extending from a corresponding one of the first-face coupling portions to the through-hole portion in a direction opposite to the first direction, and an extension portion formed in the second side surface and extending from the through-hole portion toward a corresponding one of the second-face coupling portions in the second direction.

3. The flow-path coupling member according to claim 2, wherein the extension portions have overlapped portions overlapping one another as viewed in the first direction, and a first fixation position at which the flow-path coupling member is fixed to the first flow-path member adjoins both the overlapped portions and the flow-path portions as viewed in the first direction.

4. The flow-path coupling member according to claim 3, wherein the first-face coupling portions are located, regarding the second direction, between the first fixation position and a second fixation position that differs from the first fixation position and at which the flow-path coupling member is fixed to the first flow-path member.

5. The flow-path coupling member according to claim 3, wherein to fix the flow-path coupling member to the first flow-path member at the first fixation position, a first fixing member is inserted into the flow-path coupling member and the first flow-path member in the first direction.

6. The flow-path coupling member according to claim 1, wherein the second-face coupling portions include a first second-face coupling portion and a second second-face coupling portion, the first-face coupling portions include a first first-face coupling portion communicating with the first second-face coupling portion and a second first-face coupling portion communicating with the second second-face coupling portion, the second second-face coupling portion is closer to the first outer surface than is the first second-face coupling portion regarding the first direction, and the first first-face coupling portion is closer to the second outer surface than is the second first-face coupling portion regarding the second direction.

7. The flow-path coupling member according to claim 6, further comprising a flow-path substrate having a first side surface and a second side surface opposed to each other regarding a third direction orthogonal to both the first direction and the second direction, wherein the coupling flow paths include a first coupling flow path connecting the first second-face coupling portion and the first first-face coupling portion and a second coupling flow path connecting the second second-face coupling portion and the second first-face coupling portion, the first coupling flow path includes a first through-hole portion extending through the flow-path substrate in the third direction, a first flow-path portion formed in the first side surface and extending from the first first-face coupling portion to the first through-hole portion in a direction opposite to the first direction, and a first extension portion formed in the second side surface and extending from the first through-hole portion toward the first second-face coupling portion in the second direction, the second coupling flow path includes a second through-hole portion extending through the flow-path substrate in the third direction, a second flow-path portion formed in the first side surface and extending from the second first-face coupling portion to the second through-hole portion in the direction opposite to the first direction, and a second extension portion formed in the second side surface and extending from the second through-hole portion toward the second second-face coupling portion in the second direction, a length of the first flow-path portion in the first direction is longer than a length of the second flow-path portion in the first direction, and a length of the first extension portion in the second direction is shorter than a length of the second extension portion in the second direction.

8. The flow-path coupling member according to claim 7, wherein the first coupling flow path includes a first transit portion extending from the first second-face coupling portion in a direction opposite to the second direction and a first detour portion extending from the first transit portion in the third direction and connecting the first transit portion and the first extension portion, the second extension portion connects the second through-hole portion and the second second-face coupling portion, the first extension portion and the second extension portion have overlapped portions that overlap each other as viewed in the first direction, and a first fixation position at which the flow-path coupling member is fixed to the first flow-path member adjoins the overlapped portions as viewed in the first direction and is located between the first flow-path portion and the first detour portion.

9. The flow-path coupling member according to claim 8, wherein the first second-face coupling portion partially overlaps the second second-face coupling portion as viewed in the third direction.

10. The flow-path coupling member according to claim 7, wherein as viewed in the third direction, the flow-path coupling member does not overlap an intersection point of a straight line extending in the first direction so as to pass through a center of the first-face coupling portion located farthest from the second outer surface in the second direction out of the first-face coupling portions and a straight line extending in the second direction so as to pass through a center of the second-face coupling portion located farthest from the first outer surface in the first direction out of the second-face coupling portions, and the flow-path coupling member overlaps an intersection point of a straight line extending in the first direction so as to pass through a center of the first-face coupling portion located closest to the second outer surface in the second direction out of the first-face coupling portions and a straight line extending in the second direction so as to pass through a center of the second-face coupling portion located closest to the first outer surface in the first direction out of the second-face coupling portions.

11. The flow-path coupling member according to claim 10, wherein both the number of the first-face coupling portions and the number of the second-face coupling portions are M, M being an integer of two or more, and when a straight line extending in the first direction so as to pass through a center of the first-face coupling portion located N-th farthest from the second outer surface in the second direction out of the first-face coupling portions is referred to as a first-direction straight line, N being an integer from one to M, and a straight line extending in the second direction so as to pass through a center of the second-face coupling portion located N-th farthest in the first direction out of the second-face coupling portions is referred to as a second-direction straight line, the number of intersection points at which the N-th first-direction straight line and the N-th second-direction straight line intersect each other is M, and as viewed in the third direction, the flow-path coupling member does not overlap half or more of the M intersection points and overlaps the other one or more intersection points.

12. The flow-path coupling member according to claim 1, wherein the first-face coupling portions are arranged in a row in the second direction, the second-face coupling portions are arranged in two rows in the first direction, the two rows are located side by side in a third direction orthogonal to both the first direction and the second direction, and as viewed in the third direction, each of the second-face coupling portions included in one row of the two rows partially overlaps a certain one or certain ones of the second-face coupling portions included in the other row.

13. The flow-path coupling member according to claim 1, wherein regarding the second direction, some of the first-face coupling portions are located between the second outer surface and a center position of the second outer surface and an end portion of the first outer surface farthest from the second outer surface, and regarding the first direction, some of the second-face coupling portions are located between the first outer surface and a center position of the first outer surface and an end portion of the second outer surface farthest from the first outer surface.

14. A head unit comprising:

the flow-path coupling member according to claim 1;

a first flow-path member coupled to the first-face coupling portions of the flow-path coupling member; and a nozzle configured to eject liquid supplied from the first flow-path member.

15. A liquid ejecting apparatus comprising:

the head unit according to claim 14; and a second flow-path member coupled to the second-face coupling portions of the flow-path coupling member.

16. The flow-path coupling member according to claim 1, wherein each of the first-face coupling portions opens toward the first direction, and each of the second-face coupling portions opens toward the first direction.

* * * * *